United States Patent
Imaizumi et al.

(10) Patent No.: US 8,289,227 B2
(45) Date of Patent: Oct. 16, 2012

(54) IMAGE COMMUNICATION SYSTEM, IMAGE COMMUNICATION APPARATUS, AND STORAGE MEDIUM HAVING IMAGE COMMUNICATION PROGRAM STORED THEREIN

(75) Inventors: Masahiro Imaizumi, Kyoto (JP); Hiroyuki Kono, Kyoto (JP); Yoshihiro Iwasa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 954 days.

(21) Appl. No.: 12/219,316

(22) Filed: Jul. 18, 2008

(65) Prior Publication Data
US 2010/0007926 A1   Jan. 14, 2010

(30) Foreign Application Priority Data
Jul. 11, 2008   (JP) .................. 2008-181825

(51) Int. Cl.
*G09G 5/00* (2006.01)
(52) U.S. Cl. ........................ 345/2.3; 358/434
(58) Field of Classification Search .................. 358/434; 382/303–312; 345/2.3
See application file for complete search history.

(56) References Cited

U.S. PATENT DOCUMENTS

| | | | | |
|---|---|---|---|---|
| 6,954,491 B1 * | 10/2005 | Kim et al. | ..................... | 375/220 |
| 6,988,097 B2 * | 1/2006 | Shirota | ................................ | 1/1 |
| 7,540,011 B2 * | 5/2009 | Wixson et al. | .................. | 725/52 |
| 2001/0019363 A1 * | 9/2001 | Katta et al. | ............... | 348/333.01 |
| 2006/0038914 A1 * | 2/2006 | Hanada et al. | ................ | 348/362 |
| 2006/0077165 A1 * | 4/2006 | Jang | ................................ | 345/97 |
| 2007/0252901 A1 * | 11/2007 | Yokonuma et al. | ........ | 348/231.1 |

FOREIGN PATENT DOCUMENTS

| | | |
|---|---|---|
| JP | 10-341388 | 12/1998 |
| JP | 2000-222185 | 8/2000 |
| JP | 2005-269399 | 9/2005 |
| JP | 2006-350986 | 12/2006 |

\* cited by examiner

*Primary Examiner* — Regina Liang
*Assistant Examiner* — Towfiq Elahi
(74) *Attorney, Agent, or Firm* — Nixon & Vanderhye P.C.

(57) ABSTRACT

Identification information of another image communication apparatus is received, as transmitter information indicating a transmitter, from the another image communication apparatus, and display is performed so as to indicate the transmitter on display means in accordance with the transmitter information having been received, and a user is allowed to select whether or not an image is to be received from the another image communication apparatus having transmitted the transmitter information. Next, its own identification information is transmitted, as destination information indicating a destination, to the another image communication apparatus which is selected as the transmitter from which an image is to be received. An image is received from the another image communication apparatus to which the destination information is transmitted, and the received image is stored in storage means.

26 Claims, 16 Drawing Sheets

IMAGE COMMUNICATION SYSTEM, IMAGE COMMUNICATION APPARATUS, AND STORAGE MEDIUM HAVING IMAGE COMMUNICATION PROGRAM STORED THEREIN

CROSS REFERENCE TO RELATED APPLICATION

The disclosure of Japanese Patent Application No. 2008-181825, filed on Jul. 11, 2008, is incorporated herein by reference.

FIELD

The technology herein relates to an image communication system, an image communication apparatus, and a storage medium having image communication program stored therein, and more particularly to an image communication system for allowing a plurality of apparatuses to transmit and receive images thereamong, an image communication apparatus included in the image communication system, and a storage medium having stored therein an image communication program performed by the image communication apparatus.

BACKGROUND AND SUMMARY

Conventionally, for example, Japanese Laid-Open Patent Publication No. 10-341388 (hereinafter, referred to as Patent Document 1) discloses a communication system for transmitting and receiving image data such as a photograph among a plurality of apparatuses. An electronic camera disclosed in Patent Document 1 is structured such that one transmission-end electronic camera transmits data of a taken image to a plurality of reception-end electronic cameras. In this case, the transmission-end electronic camera is allowed to select a reception-end electronic camera for receiving image data to be transmitted.

However, the electronic camera disclosed in Patent Document 1 communicates by using an infrared light, and therefore the transmission-end electronic camera and the reception-end electronic camera need to be positioned so as to face toward each other. Further, when a plurality of transmission-end electronic cameras are positioned in a range in which the reception-end electronic camera is allowed to make communication, the reception-end electronic camera is not allowed to select from among the plurality of transmission-end electronic cameras.

Therefore, an object of certain example embodiments is to provide an image communication system, an image communication apparatus, and a storage medium having an image communication program stored therein, so as to enable a user to receive an image from a desired transmission-end apparatus when images are transmitted and received among apparatuses.

Certain example embodiments have the following features to attain the object mentioned above. Here, reference numerals, step numbers, supplementary descriptions and the like in the parentheses indicate a correspondence with an embodiment described below in order to aid in understanding the exemplary embodiments and are not intended to limit, in any way, the scope of the present invention.

A first aspect is directed to an image communication system which comprises a plurality of image communication apparatuses (1) each having image storage means (28, 32, 34) for storing predetermined images, and which allows the plurality of image communication apparatuses to transmit and receive the predetermined images thereamong. An image communication apparatus (1t), among the plurality of image communication apparatuses, acting to transmit an image further includes transmitter information transmission control means (the CPU 31 for executing step 63; hereinafter only step number will be indicated). The transmitter information transmission control means transmits its own identification information, as transmitter information (transmitter data) indicating a transmitter, to an unspecified image communication apparatus other than the image communication apparatus acting to transmit an image, the unspecified image communication apparatus being among the plurality of image communication apparatuses. An image communication apparatus (1r), among the plurality of image communication apparatuses, acting to receive an image further includes: transmitter information reception means (S84); selection means (S85), and destination information transmission control means (S86, S92). The transmitter information reception means receives the transmitter information. The selection means performs display so as to indicate the transmitter (Nt1 to Nt3) on display means (12) in accordance with the transmitter information having been received, and allows a user to select whether or not an image is to be received from the image communication apparatus having transmitted the transmitter information. The destination information transmission control means transmits its own identification information, as destination information (receiver data) indicating a destination, to the image communication apparatus which is selected by the selection means as the transmitter from which an image is to be received. The image communication apparatus acting to transmit an image further includes: destination information reception control means (S64); destination determination means (S64, S65); and image transmission means (S69). The destination information reception control means receives the destination information. The destination determination means determines the image communication apparatus acting as the destination to receive an image, in accordance with the destination information having been received. The image transmission means transmits at least one of the predetermined images stored in the image storage means, to the destination determined by the destination determination means. The image communication apparatus acting to receive an image further includes: image reception means (S90) and image storage control means (S90). The image reception means receives an image transmitted by the image transmission means. The image storage control means stores, in the image storage means, the image received by the image reception means. Transmitting the transmitter information from the transmitter information transmission control means to an unspecified image communication apparatus other than the image communication apparatus acting to transmit an image includes, for example, transmitting the transmitter information without specifying a destination, and transmitting, in accordance with a request from an unidentified image communication apparatus, the transmitter information to the unidentified image communication apparatus.

In a second aspect based on the first aspect, the transmitter information reception means is capable of receiving the transmitter information corresponding to a plurality of the transmitter, the transmitter information corresponding to the plurality of the transmitter being each transmitted to the unspecified image communication apparatus. The selection means displays, on the display means, the transmitter information corresponding to each of the plurality of the transmitter, in accordance with the transmitter information having been received, and causes a user to select from among the transmitter information corresponding to the plurality of the transmitter.

In a third aspect based on the first aspect, the image communication apparatus acting to transmit an image further includes transmitter display control means (S65, FIG. 7). The transmitter display control means performs display so as to indicate, on the display means (12) of the image communication apparatus acting to transmit an image, the image communication apparatus (Nr1 to Nr3) which requests image transmission, in accordance with the destination information received from the image communication apparatus acting to receive an image.

In a fourth aspect based on the first aspect, the transmitter information includes transmitter user information (Dc) which is settable by a user of the image communication apparatus acting to transmit an image. The selection means displays, on the display means of the image communication apparatus acting to receive an image, the transmitter user information included in the transmitter information, as information indicating the image communication apparatus which transmits the transmitter information.

In a fifth aspect based on the third aspect, the destination information includes destination user information (Dc) which is settable by a user of the image communication apparatus acting to receive an image, and the transmitter display control means displays, on the display means of the image communication apparatus acting to transmit an image, the destination user information included in the destination information, as information indicating the image communication apparatus which requests the image transmission.

In a sixth aspect based on the first aspect, the image communication apparatus acting to transmit an image further includes image selection means (S66) for selecting, after receiving the destination information, an image to be transmitted to the image communication apparatus which transmits the destination information, in accordance with an operation performed by a user. The image transmission means transmits, to the image communication apparatus which transmits the destination information, the image selected by the image selection means.

In a seventh aspect based on the sixth aspect, the image selection means includes subject-image-to-be-transmitted display control means (FIG. 8). The subject-image-to-be-transmitted display control means helps a user to select an image to be transmitted to the image communication apparatus acting to receive an image, from among images stored in the image storage means as subjects to be transmitted to the image communication apparatus acting to receive an image, by displaying, on the display means of the image communication apparatus acting to transmit an image, the images stored in the image storage means as the subjects to be transmitted to the image communication apparatus acting to receive an image.

In an eighth aspect based on the sixth aspect, the image storage means of the image communication apparatus acting to transmit an image includes in-body storage means (34) and detachable storage means (28). The in-body storage means is incorporated in a body of the image communication apparatus. The detachable storage means is detachably mounted to the body of the image communication apparatus. The image selection means includes storage means selection means (S50). The storage means selection means selects one of the in-body storage means and the detachable storage means. The image selection means selects, in accordance with an operation performed by a user, an image to be transmitted to the image communication apparatus acting to receive an image, from among images stored in the storage means selected by the storage means selection means.

In a ninth aspect based on the first aspect, the image communication apparatus acting to receive an image further includes determination means and image transmission continuation request transmission means. The determination means determines, after the image reception means receives an image transmitted from the image communication apparatus acting to transmit an image, whether or not an image is to be further received from the image communication apparatus acting to transmit an image. The image transmission continuation request transmission means transmits, when the determination means determines that an image is to be further received, an image transmission continuation request to the image communication apparatus acting to transmit an image, the image communication apparatus acting to transmit an image having been selected by the selection means. The image transmission means transmits, when receiving the image transmission continuation request, an image to the image communication apparatus transmitting the image transmission continuation request.

In a tenth aspect based on the first aspect, the image communication apparatus acting to transmit an image further includes image selection means. The image selection means selects an image to be transmitted to the image communication apparatus transmitting the image transmission continuation request, in accordance with an operation performed by a user, after receiving the image transmission continuation request. The image transmission means transmits the image selected by the image selection means, to the image communication apparatus transmitting the image transmission continuation request, when receiving the image transmission continuation request.

In an eleventh aspect based on the first aspect, the image communication apparatus acting to transmit an image further includes limitation means. The limitation means limits a number of images to be simultaneously transmitted by the image transmission means.

In a twelfth aspect based on the ninth aspect, the determination means determines, in accordance with an operation performed by a user, whether or not an image is to be further received from the image communication apparatus acting to transmit an image. The image communication apparatus acting to receive an image further includes reception end informing means. The reception end informing means transmits reception end information to the image communication apparatus selected by the selection means, when the determination means determines that an image is not to be received. The image transmission means transmits, each time the image transmission continuation request is received, an image to only the image communication apparatus transmitting the image transmission continuation request, and does not transmit an image to the image communication apparatus transmitting the reception end information.

In a thirteenth aspect based on the twelfth aspect, the image communication apparatus acting to receive an image further includes remaining capacity monitoring means. The remaining capacity monitoring means monitors a remaining storage capacity of the image storage means so as to additionally store the image. The reception end informing means transmits the reception end information to the image communication apparatus selected by the selection means, when the remaining storage capacity is smaller than or equal to a predetermined capacity.

In a fourteenth aspect based on the first aspect, the image storage means of the image communication apparatus acting to receive an image further includes in-body storage means and detachable storage means. The in-body storage means is incorporated in a body of the image communication apparatus. The detachable storage means is detachably mounted to the body of the image communication apparatus. The image communication apparatus acting to receive an image further includes storage means determination means (S50). The storage means determination means predetermines one of the in-body storage means and the detachable storage means, as storage means for storing the received image. The image storage control means stores, in the storage means predetermined by the storage means determination means, an image transmitted from the image communication apparatus acting to transmit an image.

In a fifteenth aspect based on the first aspect, each of the plurality of image communication apparatuses further includes image taking means and photographing means. The photographing means stores an image taken by the image taking means, in the image storage means, in accordance with a predetermined operation performed by a user. The image transmission means transmits the image stored in the image storage means by the photographing means.

A sixteenth aspect is directed to an image communication apparatus (1r) for receiving an image from another image communication apparatus. The image communication apparatus comprises: storage means; transmitter information reception means; selection means; destination information transmission control means; image reception means; and image storage control means. The transmitter information reception means receives, from the another image communication apparatus, identification information of the another image communication apparatus as transmitter information indicating a transmitter. The selection means performs display so as to indicate the transmitter on display means in accordance with the transmitter information having been received, and allows a user to select whether or not an image is to be received from the another image communication apparatus having transmitted the transmitter information. The destination information transmission control means transmits its own identification information, as destination information indicating a destination, to the image communication apparatus which is selected by the selection means as the transmitter from which an image is to be received. The image reception means receives an image transmitted by the another image communication apparatus to which the destination information is transmitted. The image storage control means stores, in the storage means, the image received by the image reception means.

A seventeenth aspect is directed to an image communication apparatus (10 for transmitting an image to another image communication apparatus. The image communication apparatus comprises: image storage means; transmitter information transmission control means; destination information reception control means; destination determination means; and image transmission means. The image storage means stores a predetermined image. The transmitter information transmission control means transmits its own identification information, as transmitter information indicating a transmitter, to another unspecified image communication apparatus. The destination information reception control means receives, from the another image communication apparatus, identification information of the another image communication apparatus, as destination information indicating a destination. The destination determination means determines, in accordance with the destination information having been received, the another image communication apparatus acting, as the destination, to receive an image. The image transmission means transmits at least one of a plurality of the predetermined image stored in the image storage means, to the destination determined by the destination determination means.

An eighteenth aspect is directed to an image communication apparatus (1) for receiving an image from another image communication apparatus or transmitting an image to another image communication apparatus. The image communication apparatus comprises: image storage means; and transmission/reception determination means (S51). The image storage means stores a predetermined image. The transmission/reception determination means determines whether an image is to be received from another image communication apparatus or an image is to be transmitted to another image communication apparatus. When the transmission/reception determination means determines that an image is to be received from another image communication apparatus, the image communication apparatus further comprises: transmitter information reception means; selection means; destination information transmission control means; image reception means; and image storage control means. The transmitter information reception means receives, from the another image communication apparatus, identification information of the another image communication apparatus, as transmitter information indicating a transmitter. The selection means performs display so as to indicate the transmitter on display means in accordance with the transmitter information having been received, and allows a user to select whether or not an image is to be received from the another image communication apparatus having transmitted the transmitter information. The destination information transmission control means transmits its own identification information, as destination information indicating a destination, to the another image communication apparatus which is selected by the selection means as the transmitter from which an image is to be received. The image reception means receives an image transmitted from the another image communication apparatus to which the destination information is transmitted. The image storage control means stores, in the image storage means, the image received by the image reception means. When the transmission/reception determination means determines that an image is to be transmitted to another image communication apparatus, the image communication apparatus further comprises: transmitter information transmission control means; destination information reception control means; destination determination means; and image transmission means. The transmitter information transmission control means transmits, to another unspecified image communication apparatus, its own identification information as transmitter information indicating a transmitter. The destination information reception control means receives, from the another image communication apparatus, identification information of the another image communication apparatus, as the destination information indicating the destination. The destination determination means determines, in accordance with the destination information having been received, the another image communication apparatus acting as the destination to receive an image. The image transmission means transmits, to the destination determined by the destination determination means, at least one of a plurality of the predetermined image stored in the image storage means.

A nineteenth aspect is directed to a computer-readable storage medium having stored therein an image communication program executed by a computer (31) of an apparatus for receiving an image from an image communication apparatus other than the apparatus. The image communication program causes the computer to function as: transmitter information reception means; selection means; destination information transmission control means; image reception means; and image storage control means. The transmitter information reception means receives, from the image communication apparatus other than the apparatus, identification information of the image communication apparatus other than the apparatus as transmitter information indicating a transmitter. The selection means performs display so as to indicate the transmitter on display means in accordance with the transmitter information having been received, and allows a user to select whether or not an image is to be received from the image communication apparatus having transmitted the transmitter information. The destination information transmission control means transmits its own identification information, as destination information indicating a destination, to the image communication apparatus which is selected by the selection means as the transmitter from which an image is to be received. The image reception means receives an image transmitted by the image communication apparatus to which the destination information is transmitted. The image storage control means stores, in a storage device, the image received by the image reception means.

A twentieth aspect is directed to a computer-readable storage medium having stored therein an image communication program executed by a computer of an apparatus for receiving an image from an image communication apparatus other than the apparatus or transmitting an image to an image communication apparatus other than the apparatus. A predetermined image is stored in a storage device of the apparatus. The image communication program causes the computer to function as transmission/reception determination means. The transmission/reception determination means determines whether an image is to be received from an image communication apparatus other than the apparatus or an image is to be transmitted to an image communication apparatus other than the apparatus. When the transmission/reception determination means determines that an image is to be received from an image communication apparatus other than the apparatus, the image communication program causes the computer to further function as: transmitter information reception means; selection means; destination information transmission control means; image reception means; and image storage control means. The transmitter information reception means receives, from the image communication apparatus other than the apparatus, identification information of the image communication apparatus other than the apparatus, as transmitter information indicating a transmitter. The selection means performs display so as to indicate the transmitter on display means in accordance with the transmitter information having been received, and allows a user to select whether or not an image is to be received from the image communication apparatus having transmitted the transmitter information. The destination information transmission control means transmits its own identification information, as destination information indicating a destination, to the image communication apparatus which is selected by the selection means as the transmitter from which an image is to be received. The image reception means receives an image transmitted from the image communication apparatus to which the destination information is transmitted. The image storage control means stores, in the storage device, the image received by the image reception means. When the transmission/reception determination means determines that an image is to be transmitted to an image communication apparatus other than the apparatus, the image communication program causes the computer to further function as: transmitter information transmission control means; destination information reception control means; destination determination means; and image transmission means. The transmitter information transmission control means transmits, to an unspecified image communication apparatus other than the apparatus, its own identification information as the transmitter information indicating the transmitter. The destination information reception control means receives, from the image communication apparatus other than the apparatus, identification information of the image communication apparatus other than the apparatus, as the destination information indicating the destination. The destination determination means determines, in accordance with the destination information having been received, the image communication apparatus acting as the destination to receive an image. The image transmission means transmits, to the destination determined by the destination determination means, at least one of a plurality of the predetermined image stored in the storage device.

According to the first aspect, the image communication apparatus acting to receive an image is allowed to select, depending on a transmitter, whether or not an image is to be received, thereby preventing an image from being transmitted by an unintended transmitter. On the other hand, the image communication apparatus acting to transmit an image is allowed to collect receivers to which an image is to be distributed, without specifying, in advance, an apparatus acting to receive an image, and distribute the image.

According to the second aspect, the image communication apparatus acting to receive an image is allowed to select from among a plurality of transmitters, a transmitter from which image data is to be received. For example, when a plurality of image communication apparatuses act as transmitters, respectively, the image communication apparatus acting to receive an image is allowed to select an image communication apparatus desired by a user from among the plurality of image communication apparatuses, so as to receive an image.

According to the third aspect, a user of the image communication apparatus acting to transmit an image is allowed to know the image communication apparatus to which an image is to be transmitted.

According to the fourth aspect, a user of the image communication apparatus acting to transmit an image is allowed to represent its characteristic, and the image communication apparatus acting to receive the image is allowed to easily identify the image communication apparatus acting to transmit the image.

According to the fifth aspect, a user of the image communication apparatus acting to receive an image is allowed to represent its characteristic, and the image communication apparatus acting to transmit an image is also allowed to easily identify the image communication apparatus acting to receive an image.

According to the sixth aspect, an image can be selected and transmitted as desired by a user of the image communication apparatus acting to transmit an image. Further, after the image communication apparatus acting to receive an image and the image communication apparatus acting to transmit an image are determined, an image to be transmitted from the image communication apparatus acting to transmit an image to the image communication apparatus is selected, so that the image communication apparatus acting to transmit the image is allowed to determine the types and the number of the images to be transmitted to the image communication apparatus acting to receive an image.

According to the seventh aspect, the display means displays images stored as subjects to be transmitted, and therefore a user of the image communication apparatus acting to transmit an image is allowed to easily select an image.

According to the eighth aspect, an image to be transmitted is allowed to be limited to an image stored in a predetermined storage means.

According to the ninth aspect, the image communication apparatus acting to transmit an image is allowed to transmit images step-by-step to the image communication apparatus acting to receive an image.

According to the tenth aspect, an image to be transmitted can be selected and transmitted each time a request is issued from the reception end.

According to the eleventh aspect, images are transmitted from the image communication apparatus acting as a transmitter in units of a predetermined number of images or less, and therefore the reception-end apparatus is allowed to receive images while confirming the number of the received images, and to determine whether or not the reception is to be continued based on the number of the received images.

According to the twelfth aspect, each image communication apparatus acting to receive an image is allowed to stop acting as a subject apparatus to which the image communication apparatus acting to transmit an image is to transmit an image, at a time desired by a user of each image communication apparatus acting to receive an image.

According to the thirteenth aspect, the image communication apparatus acting to receive an image is allowed to automatically stop acting as a subject apparatus to which the image communication apparatus acting to transmit an image is to transmit an image, based on a capacity for storing image data.

According to the fourteenth aspect, received image data may be stored in only a predetermined storage means.

According to the fifteenth aspect, an image taken by the image communication apparatus may be transmitted and received.

Furthermore, according to certain example embodiments, the image communication apparatus and the storage medium having the image communication program stored therein can exert the same effect as the image communication system described above.

These and other objects, features, aspects and advantages of the present invention will become more apparent from the following detailed description of the present invention when taken in conjunction with the accompanying drawings.

DETAILED DESCRIPTION

Figure 1:
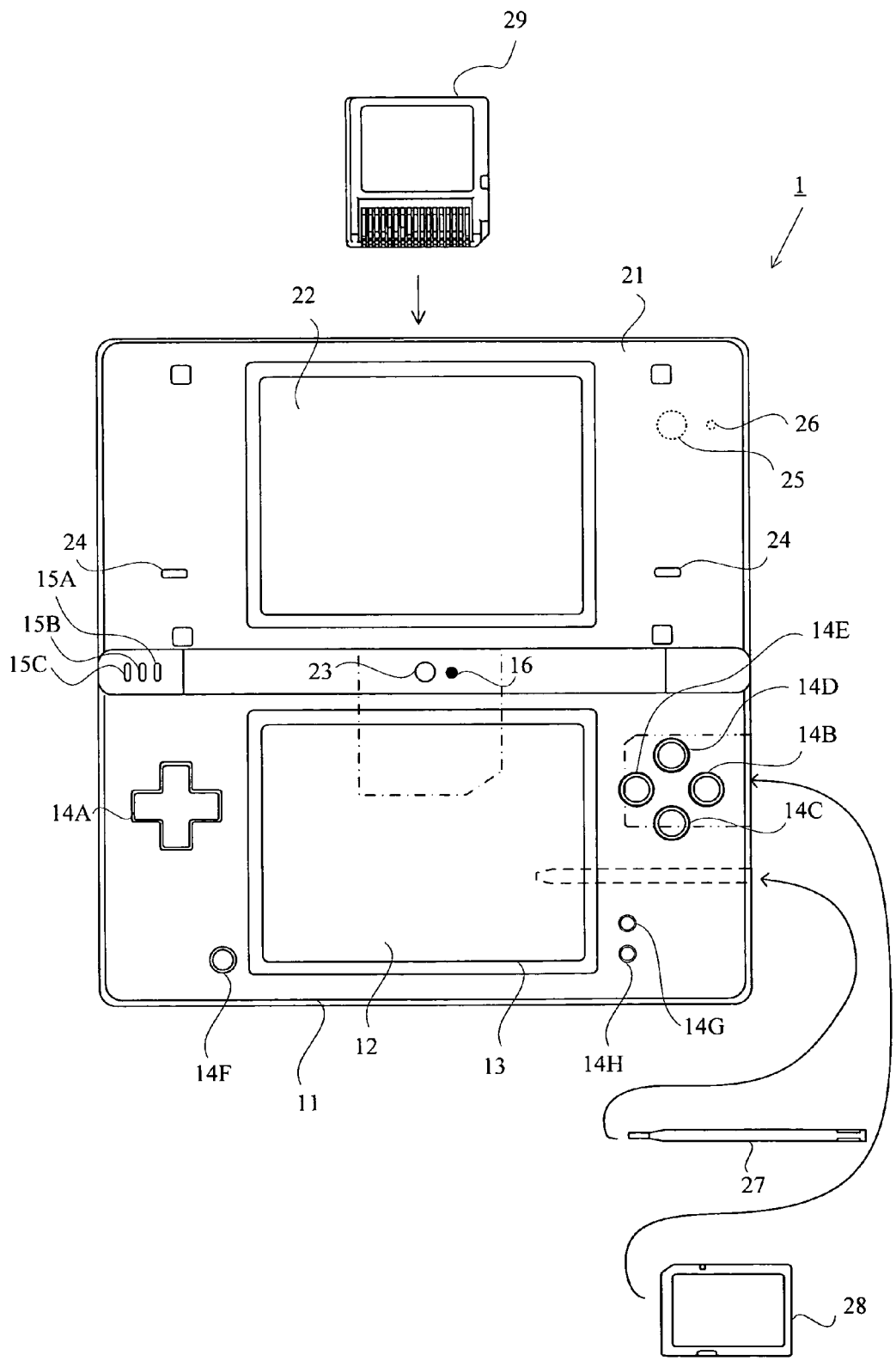
FIG. 1 is an external view of a game apparatus 1 executing an image communication program according to an embodiment.

With reference to the drawings, an image communication apparatus executing an image communication program according to an embodiment will be described. Although the image communication program may be executed by any computer system, a case where a game apparatus 1 is used as an exemplary image communication apparatus, and the image communication program is executed by the game apparatus 1 will be described. FIG. 1 is an external view of the game apparatus 1 executing the image communication program. Here, a hand-held game apparatus is used as the exemplary game apparatus 1. The game apparatus 1 includes a camera, and functions, as an imaging apparatus, to take an image with the camera, to display the taken image on a screen, to store data of the taken image, and to transmit to and receive from another apparatus the data of the taken image. In the present embodiment, taking an image as data by using the camera is referred to as "taking an image", and storing the taken image as data is referred to as "photographing".

In FIG. 1, the game apparatus 1 is a foldable hand-held game apparatus, and FIG. 1 shows a state (opened state) where the game apparatus 1 is opened. The game apparatus 1 is configured to have such a size as to be able to be held by a user with both hands or one hand, even when the game apparatus 1 is opened.

The game apparatus 1 includes a lower housing 11 and an upper housing 21. The lower housing 11 and the upper housing 21 are connected to each other so as to be openable and closable (foldable). In an example of FIG. 1, the lower housing 11 and the upper housing 21 are each formed in a plate-like shape of a horizontally long rectangle, and foldably connected to each other at long side portions thereof. Usually, a user uses the game apparatus 1 in the opened state. When not using the game apparatus 1, a user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state by frictional force generated at a connection portion, and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. It is noted that although an LCD is used as a display device provided in the game apparatus 1 in the present embodiment, any other display devices such as a display device using an EL (Electro Luminescence), and the like may be used. In addition, the game apparatus 1 can use a display device of any resolution.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14D, the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation, and the like. The operation buttons 14B to 14E are used, for example, for a determination operation, a cancellation operation, and the like. The power button 14F is used for powering the game apparatus 10N or OFF. In the example shown in FIG. 1, the direction input button 14A and the power button 14F are provided on the inner main surface of the lower housing 11 and on one of a left side and a right side (on the left side in FIG. 1) of the lower LCD 12 provided in the vicinity of the center of the inner main surface of the lower housing 11. Further, the operation buttons 14B to 14E, the start button 14G, and the select button 14H are provided on the inner main surface of the lower housing 11 and on the other of the left side and the right side (on the right side in FIG. 1) of the lower LCD 12. The direction input button 14A, the operation buttons 14B to 14E, the start button 14G, and the select button 14H are used for performing various operations with respect to the game apparatus 1.

It is noted that the operation buttons 14I to 14K are omitted in FIG. 1. For example, the L button 14I is provided at a left end of an upper surface of the lower housing 11, and the R button 14J is provided at a right end of the upper surface of the lower housing 11. The L button 14I and the R button 14J are used, for example, for performing a photographing instruction operation (a shutter operation) with respect to the game apparatus 1. In addition, the volume button 14K is provided on a left side surface of the lower housing 11. The volume button 14K is used for adjusting volume of speakers of the game apparatus 1.

The game apparatus 1 further includes the touch panel 13 as another input device in addition to the operation buttons 14A to 14K. The touch panel 13 is mounted so as to cover a screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of, for example, the lower LCD 12. However, the resolution of the touch panel 13 and the resolution of the lower LCD 12 may not necessarily be the same as each other. In the right side surface of the lower housing 11, an insertion opening (a dotted line shown in FIG. 1) for a touch pen 27 is provided. The insertion opening is capable of accommodating the touch pen 27 which is used for performing an operation with respect to the touch panel 13. Although an input with respect to the touch panel 13 is usually performed using the touch pen 27, in addition to the touch pen 27, a finger of a user can be used for operating the touch panel 13.

In the right side surface of the lower housing 11, an insertion opening (indicated by a two-dot chain line in FIG. 1) is provided for accommodating a memory card 28. Inside the insertion opening, a connector (not shown) is provided for electrically connecting the game apparatus 1 to the memory card 28. The memory card 28 is, for example, an SD (Secure Digital) memory card, and detachably mounted to the connector. The memory card 28 is used, for example, for storing an image taken by the game apparatus 1, and loading an image generated by another apparatus into the game apparatus 1.

Further, in the upper surface of the lower housing 11, an insertion opening (indicated by a chain line in FIG. 1) is provided for accommodating a memory card 29. Inside the insertion opening, a connector (not shown) is provided for electrically connecting the game apparatus 1 to the memory card 29. The memory card 29 is a storage medium for storing an image communication program, a game program, and the like, and detachably mounted in the insertion opening provided in the lower housing 11.

Three LEDs 15A to 15C are mounted to a left side part of the connection portion where the lower housing 11 and the upper housing 21 are connected to each other. The game apparatus 1 is capable of performing wireless communication with another apparatus, and the first LED 15A is lit up while wireless communication is established. The second LED 15B is lit up while the game apparatus 1 is charged. The third LED 15C is lit up while the power of the game apparatus 1 is ON. Thus, by the three LEDs 15A to 15C, a state of communication establishment of the game apparatus 1, a state of charge of the game apparatus 1, and a state of ON/OFF of the power of the game apparatus 1 can be informed to the user.

Meanwhile, in the upper housing 21, an upper LCD 22 is provided. The upper LCD 22 has a horizontally long shape, and is located such that a long side direction thereof corresponds to a long side direction of the upper housing 21. Similarly as the lower LCD 12, a display device of another type having any resolution may be used instead of the upper LCD 22. A touch panel may be provided so as to cover the upper LCD 22.

In the upper housing 21, two cameras (an inner camera 23 and an outer camera 25) are provided. As shown in FIG. 1, the inner camera 23 is mounted in an inner main surface of the upper housing 21 and adjacent to the connection portion. On the other hand, the outer camera 25 is mounted on a surface opposite to the inner main surface in which the inner camera 23 is mounted, namely, in an outer main surface (a surface located on the outside of the game apparatus 1 in the closed state, and a back surface of the upper housing 21 shown in FIG. 1) of the upper housing 21. In FIG. 1, the outer camera 25 is indicated by a dashed line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. Thus, in the present embodiment, the two cameras, i.e., the inner camera 23 and the outer camera 25, are provided such that the imaging directions thereof are opposite to each other. For example, a user can take an image of a view seen from the game apparatus 1 toward the user with the inner camera 23 as well as an image of a view seen from the game apparatus 1 in a direction opposite to the user with the outer camera 25. The lower LCD 12 and/or the upper LCD 22 may be used to display, in real time, an image taken by the inner camera 23 or the outer camera 25.

A microphone (a microphone 43 shown in FIG. 2) as a voice input device is accommodated on the inner main surface in the vicinity of the connection portion. In the inner main surface in the vicinity of the connection portion, a microphone hole 16 is formed to allow the microphone 43 to detect sound outside the game apparatus 1. The accommodating position of the microphone 43 and the position of the microphone hole 16 are not necessarily in the connection portion. For example, the microphone 43 may be accommodated in the lower housing 11, and the microphone hole 16 may be provided in the lower housing 11 so as to correspond to the accommodating position of the microphone 43.

In the outer main surface of the upper housing 21, a fourth LED 26 (indicated by a dashed line in FIG. 1) is mounted. The fourth LED 26 is lit up while an image is being taken by the inner camera 23 or the outer camera 25. Further, the fourth LED 26 may blink while a moving image is photographed (the taken image is stored as a moving image) by the inner camera 23 or the outer camera 25. The fourth LED 26 may be extinguished from the moment a shutter is released up to completion of storage of an image which is taken at the moment the shutter is released, so as to prevent the LED from being included in the image. By the fourth LED 26, it is informed to an object person whose image is photographed and people around the object person that an image is being taken by the game apparatus 1.

Sound holes 24 are formed in the inner main surface of the upper housing 21 and on each of left and right sides of the upper LCD 22 provided in the vicinity of the center of the inner main surface of the upper housing 21. The speakers are accommodated in the upper housing 21 and at the back of the sound holes 24. The sound holes 24 are holes for releasing sound from the speakers to the outside of the game apparatus 1.

As described above, the inner camera 23 and the outer camera 25 which are configurations for taking an image, and the upper LCD 22 which is display means for displaying the various images are provided in the upper housing 21. On the other hand, the input devices (the touch panel 13 and the buttons 14A to 14K) for performing an operation input with respect to the game apparatus 1, and the lower LCD 12 which is display means for displaying various images are provided in the lower housing 11. Thus, when using the game apparatus 1, the user can hold the lower housing 11 and perform an input with respect to the input device while looking at a taken image (an image taken by the camera) displayed on the lower LCD 12 or the upper LCD 22, for example.

Figure 2:
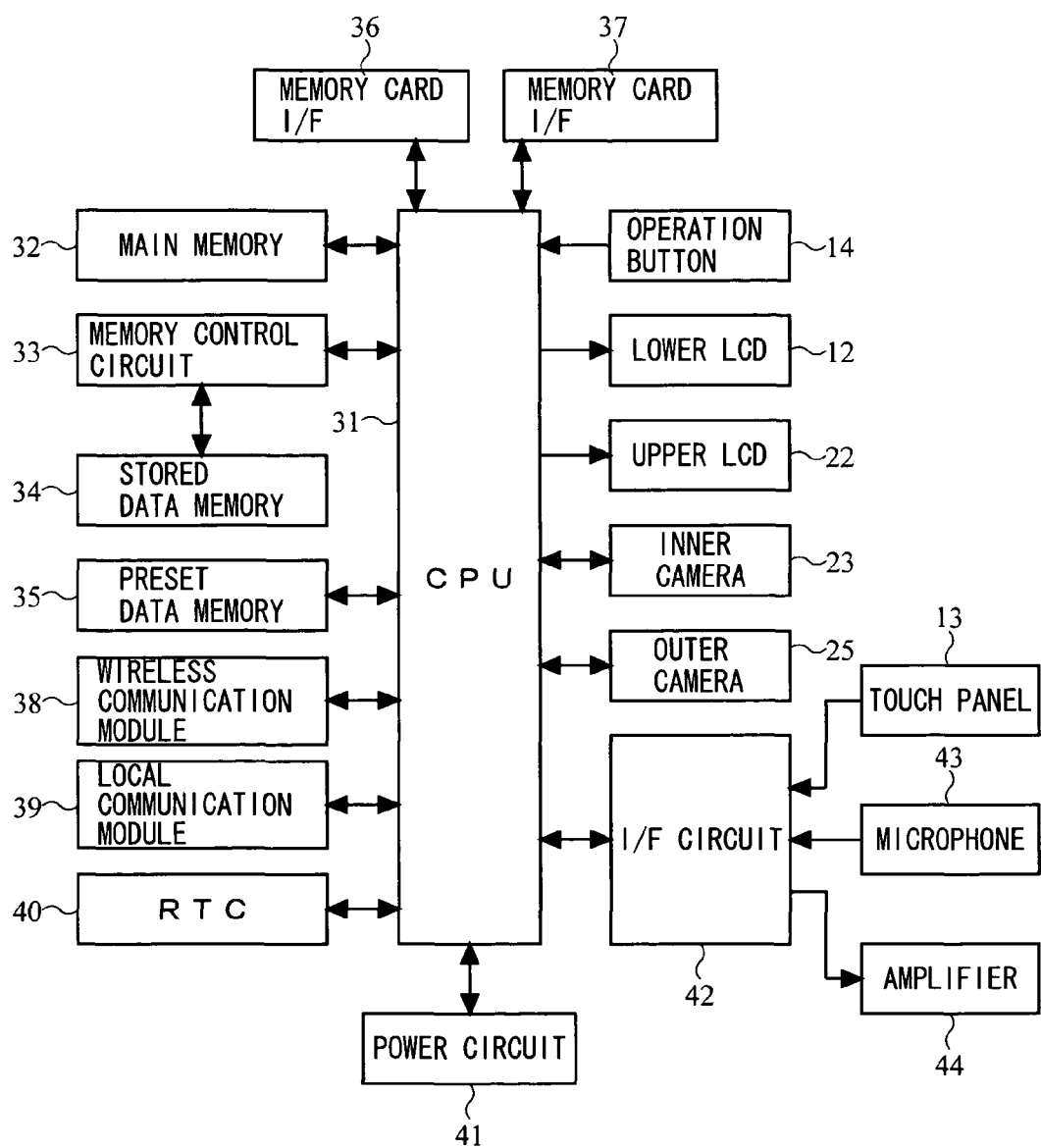
FIG. 2 is a block diagram showing an example of the internal configuration of the game apparatus 1 shown in FIG. 1.

The following will describe an internal configuration of the game apparatus 1 with reference to FIG. 2. FIG. 2 is a block diagram showing an example of the internal configuration of the game apparatus 1.

As shown in FIG. 2, the game apparatus 1 includes electronic components including a CPU 31, a main memory 32, a memory control circuit 33, a stored data memory 34, a preset data memory 35, memory card interfaces (memory card I/Fs) 36 and 37, a wireless communication module 38, a local communication module 39, a real time clock (RTC) 40, a power circuit 41, an interface circuit (I/F circuit) 42, and the like. These electronic components are mounted on an electronic circuit substrate and accommodated in the lower housing 11 (or may be accommodated in the upper housing 21).

The CPU 31 is information processing means for executing a predetermined program. In the present embodiment, the predetermined program is stored in a memory (e.g. the stored data memory 34) within the game apparatus 1 or in the memory cards 28 and/or 29, and the CPU 31 executes later-described image communication processing by executing the predetermined program. It is noted that the program executed by the CPU 31 may be stored in advance in a memory within the game apparatus 1, may be obtained from the memory cards 28 and/or 29, or may be obtained from another apparatus by means of communication with the other apparatus.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In other words, the main memory 32 stores various data used in the information processing, and also stores a program obtained from the outside (the memory cards 28 and 29, another apparatus, and the like). In the present embodiment, for example, a PSRAM (Pseudo-SRAM) is used as the main memory 32. The stored data memory 34 is storage means for storing the program executed by the CPU 31, data of images taken by the inner camera 23 and the outer camera 25, and the like. The stored data memory 34 is constructed of a nonvolatile storage medium, for example, a NAND flash memory in the present embodiment. The memory control circuit 33 is a circuit for controlling reading of data from the stored data memory 34 or writing of data to the stored data memory 34 in accordance with an instruction from the CPU 31. The preset data memory 35 is storage means for storing data (preset data), such as various parameters, which are set in advance in the game apparatus 1, and the like. A flash memory connected to the CPU 31 via an SPI (Serial Peripheral Interface) bus can be used as the preset data memory 35.

The memory card I/Fs 36 and 37 are each connected to the CPU 31. The memory card I/F 36 reads data from the memory card 28 mounted to the connector and writes data to the memory card 28 mounted to the connector in accordance with an instruction from the CPU 31. On the other hand, the memory card OF 37 reads data from the memory card 29 mounted to the connector and writes data to the memory card 29 mounted to the connector in accordance with an instruction from the CPU 31. In the present embodiment, data of images taken by the inner camera 23 and the outer camera 25 and data of an image received from another apparatus are written to the memory card 28, and image data stored in the memory card 28 is read from the memory card 28 to be stored in the stored data memory 34 or transmitted to another apparatus. Various programs stored in the memory card 29 are read by the CPU 31 to be executed.

The image communication program may be supplied to a computer system via a wired or wireless communication line, in addition to from an external storage medium such as the memory card 29, and the like. The image communication program may be stored in advance in a nonvolatile storage unit within the computer system. An information storage medium for storing the image communication program is not limited to the above nonvolatile storage unit, but may be a CD-ROM, a DVD, or an optical disc-shaped storage medium similar to them.

The wireless communication module 38 functions to connect to a wireless LAN device, for example, by a method conformed to the standard of IEEE802.11.b/g. The local communication module 39 functions to wirelessly communicate with a game apparatus of the same type by a predetermined communication method. The wireless communication module 38 and the local communication module 39 are connected to the CPU 31. The CPU 31 is capable of receiving data from and sending data to another apparatus via the Internet using the wireless communication module 38, and capable of receiving data from and sending data to another game apparatus of the same type using the local communication module 39.

The RTC 40 and the power circuit 41 are connected to the CPU 31. The RTC 40 counts a time, and outputs the time to the CPU 31. For example, the CPU 31 is capable of calculating a current time (date), and the like based on the time counted by the RTC 40. The power circuit 41 controls electric power from a power supply (typically, a battery accommodated in the lower housing 11) of the game apparatus 1 to supply the electric power to each component of the game apparatus 1.

The game apparatus 1 includes the microphone 43 and an amplifier 44. The microphone 43 and the amplifier 44 are connected to the I/F circuit 42. The microphone 43 detects voice produced by the user toward the game apparatus 1, and outputs a voice signal indicative of the voice to the I/F circuit 42. The amplifier 44 amplifies the voice signal from the I/F circuit 42, and causes the speakers (not shown) to output the voice signal. The I/F circuit 42 is connected to the CPU 31.

The touch panel 13 is connected to the I/F circuit 42. The I/F circuit 42 includes a voice control circuit for controlling the microphone 43 and the amplifier 44 (the speakers), and a touch panel control circuit for controlling the touch panel 13. The voice control circuit performs A/D conversion and D/A conversion with respect to the voice signal, and converts the voice signal into voice data in a predetermined format. The touch panel control circuit generates touch position data in a predetermined format based on a signal from the touch panel 13, and outputs the touch position data to the CPU 31. For example, the touch position data is data indicative of coordinates of a position at which an input is performed with respect to an input surface of the touch panel 13. The touch panel control circuit reads a signal from the touch panel 13 and generates touch position data every a predetermined time period. Through the I/F circuit 42, the CPU 31 is capable of recognizing a position at which an input is performed with respect to the touch panel 13 by obtaining the touch position data.

An operation button 14 includes the above operation buttons 14A to 14K, and is connected to the CPU 31. The operation button 14 outputs operation data indicative of an input state (whether or not each button is pressed) with respect to each of the operation buttons 14A to 14K to the CPU 31. The CPU 31 obtains the operation data from the operation button 14, and executes processing in accordance with an input with respect to the operation button 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. For example, the CPU 31 gives, to one of the inner camera 23 or the outer camera 25, an instruction for taking an image, and the camera which has received the instruction takes an image and sends image data to the CPU 31.

The lower LCD 12 and the upper LCD 22 are connected to the CPU 31. Each of the lower LCD 12 and the upper LCD 22 displays an image thereon in accordance with an instruction from the CPU 31. For example, the CPU 31 causes a taken image obtained from one of the inner camera 23 or the outer camera 25 to be displayed on one of the lower LCD 12 or the upper LCD 22, and an operation explanation screen generated by predetermined processing to be displayed on the other of the lower LCD 12 or the upper LCD 22.

Figure 3:
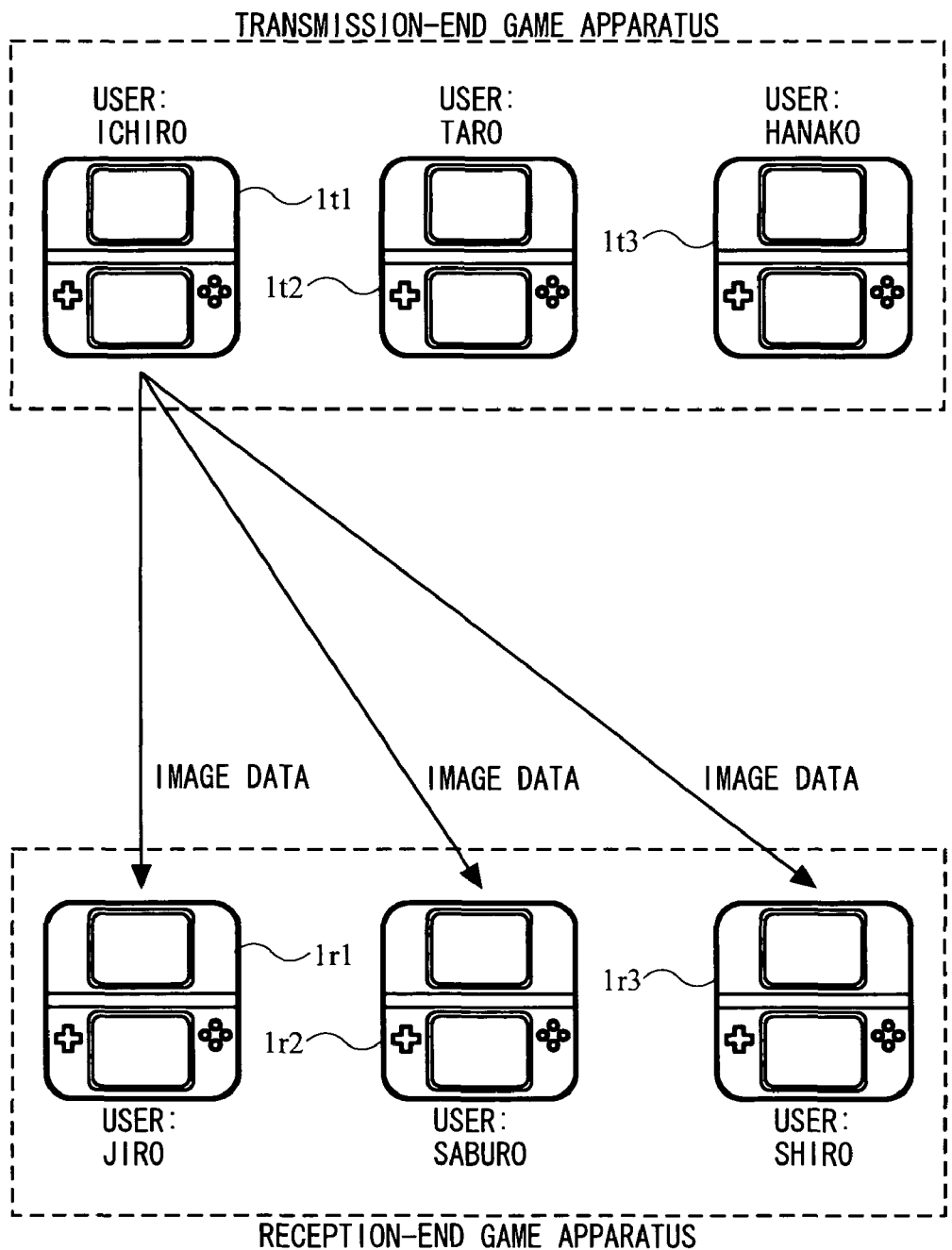
FIG. 3 is a diagram illustrating an exemplary system in which a plurality of the game apparatus 1 are connected to each other.
Figure 4:
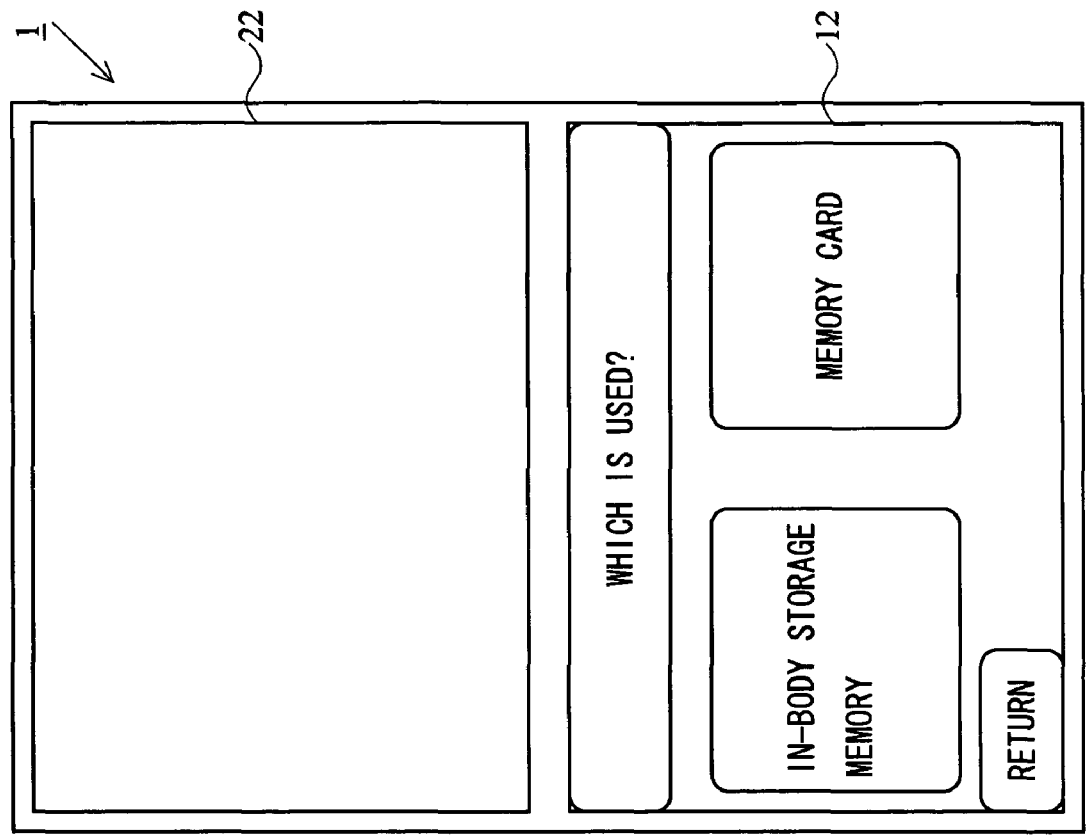
FIG. 4 is a diagram illustrating an exemplary screen display displayed on a lower LCD 12 and an upper LCD 22 of the game apparatus 1 before whether the game apparatus acts as a transmission-end apparatus or a reception-end apparatus is determined.
Figure 5:
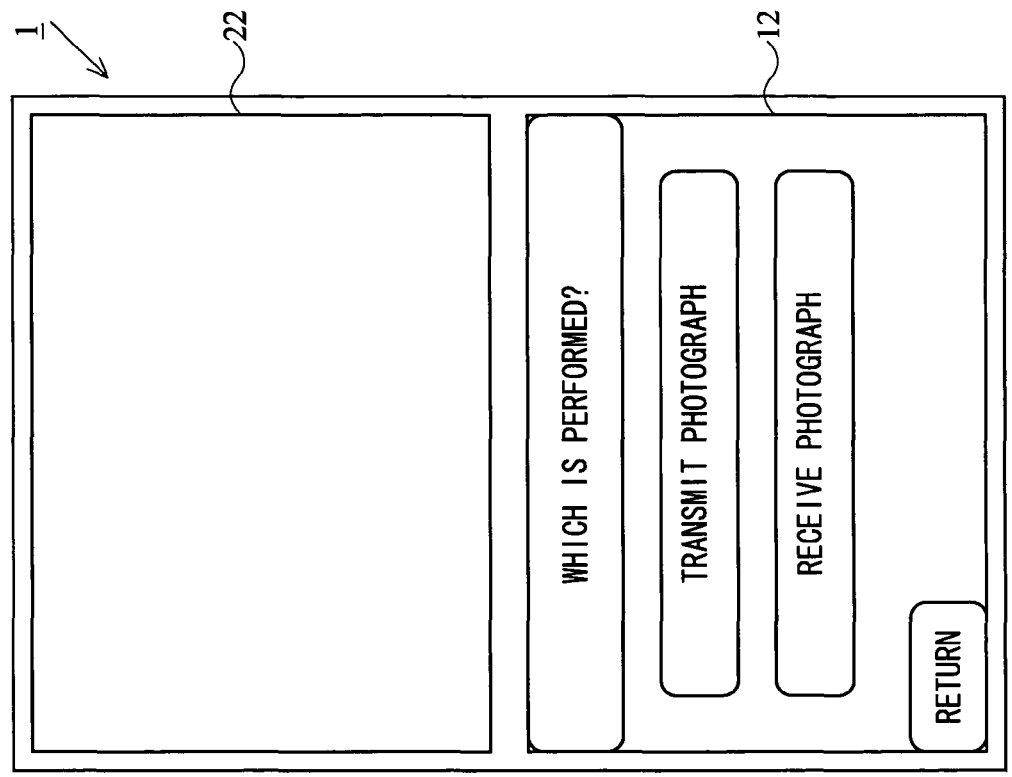
FIG. 5 is a diagram illustrating an exemplary screen display displayed on the lower LCD 12 and the upper LCD 22 of the game apparatus 1 before whether the game apparatus acts as a transmission-end apparatus or a reception-end apparatus is determined.
Figure 11:
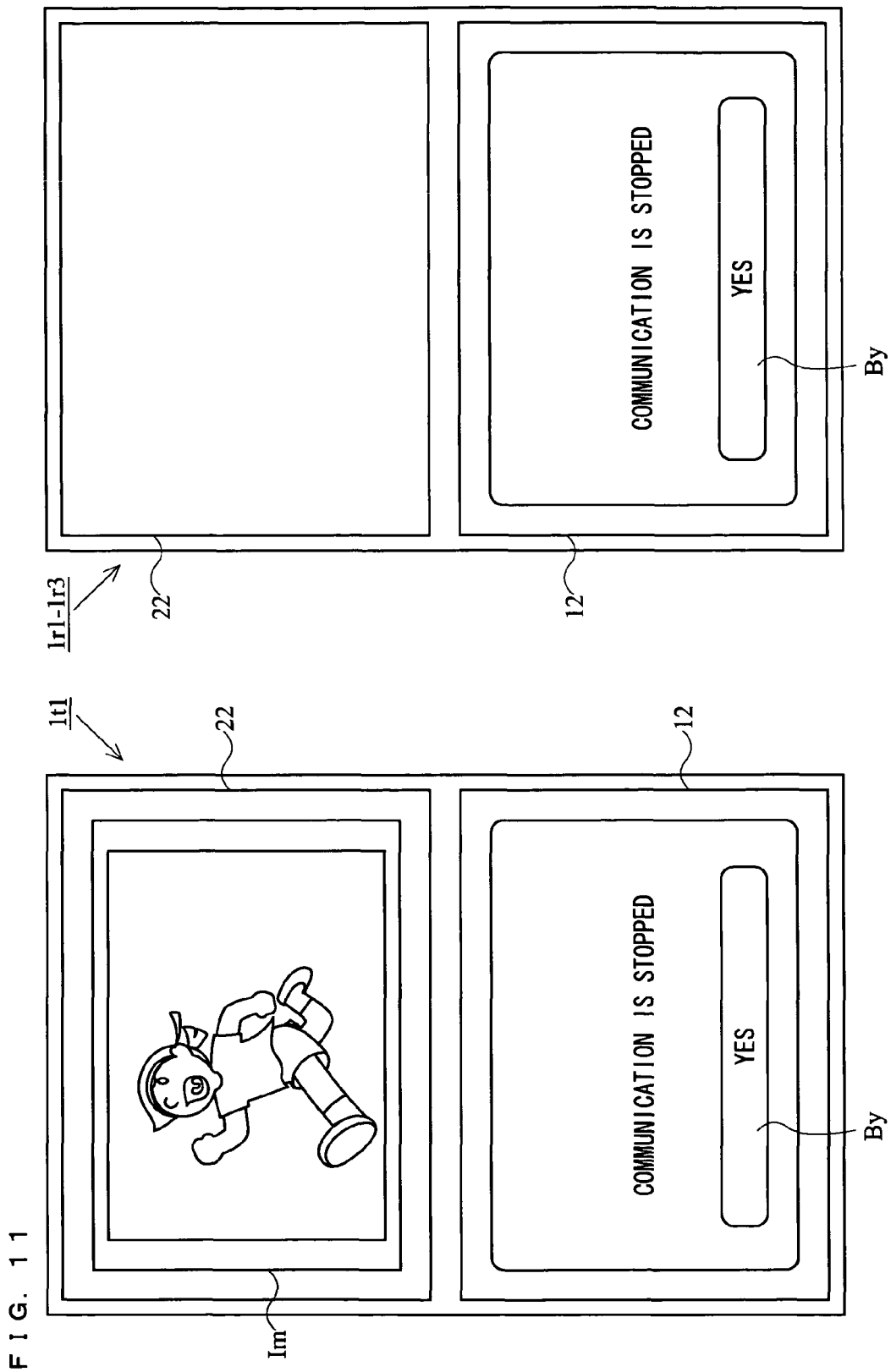
FIG. 11 is a diagram illustrating exemplary screen displays displayed, when communication is stopped, on the lower LCD 12 and the upper LCD 22 of each of the transmission-end game apparatus 1t1, and the reception-end game apparatuses 1r1 to 1r3.

Next, before a specific process operation performed by the game apparatus 1 executing the image communication program will be described, an exemplary display manner in which display is performed on the lower LCD 12 and/or the upper LCD 22 through the process operation, exemplary connection to another apparatus, and the like will be described with reference to FIGS. 3 to 11. FIG. 3 is a diagram illustrating an exemplary image communication system in which a plurality of the game apparatus 1 are connected to each other. FIGS. 4 and 5 are diagrams illustrating exemplary screen displays displayed on the lower LCD 12 and the upper LCD 22 of the game apparatus 1 before whether the game apparatus 1 acts as a transmission-end apparatus or a reception-end apparatus is determined FIGS. 6 to 10 are diagrams illustrating exemplary screen displays displayed in the first stage to the fifth stage, respectively, of a communication program, on the lower LCD 12 and the upper LCD 22 of each of the transmission-end game apparatus 1$t$1 and the reception-end game apparatuses in to 1$r$3. FIG. 11 is a diagram illustrating exemplary screen displays displayed on the lower LCD 12 and the upper LCD 22 of each of the transmission-end game apparatus 1$t$1 and the reception-end game apparatuses 1$r$1 to 1$r$3 when communication is stopped.

In FIG. 3, a plurality of the game apparatus 1 transmit and receive image data such as a photograph (taken image) and the like through radio communication. As described above, the game apparatus 1 is allowed to make radio communication with another game apparatus 1 by using the wireless communication module 38 and/or the local communication module 39, and an example in which the game apparatus 1 makes radio communication to game apparatuses of the same type by using the local communication module 39 based on a predetermined communication scheme will be described. For making the description specific, an example where the game apparatuses 1$t$1 to 1$t$3 are each a transmission-end game apparatus 1$t$ acting to transmit image data, and the game apparatuses 1$r$1 to 1$r$3 are each a reception-end game apparatus 1$r$ acting to receive image data will be described with reference to FIG. 3.

In the present embodiment, a user is allowed to select whether his/her game apparatus is to act to transmit image data or to act to receive image data when the image communication program is executed. Specifically, whether the game apparatus 1 acts as a transmission-end game apparatus or a reception-end game apparatus is determined in accordance with a user's selection. However, a transmission-end apparatus for executing a transmission-end program only and a reception-end apparatus for executing a reception-end program only may be independent of each other.

The transmission-end game apparatus 1$t$ includes the game apparatus 1$t$1 for which a user is "Ichiro", the game apparatus 1$t$2 for which a user is "Taro", and the game apparatus 1$t$3 for which a user is "Hanako". On the other hand, the reception-end game apparatus 1$r$ includes the game apparatus 1$r$1 for which a user is "Jiro", the game apparatus 1$r$2 for which a user is "Saburo", and the game apparatus 1$r$3 for which a user is "Shiro". In this case, the transmission-end game apparatuses 1t1 to 1t3 perform broadcast transmission of signals (transmitter data) indicating that the transmission-end game apparatuses 1t1 to 1t3 are transmitters, respectively, of image data. An example in which the users "Jiro", "Saburo", and "Shiro" each receives image data from the game apparatus 1t1 acting as a transmitter for which the user is "Ichiro", among the transmission-end game apparatus 1t including a plurality of game apparatuses, will be described. "Ichiro", "Taro", and the like each represents a user name stored in a body of the game apparatus 1, and a user is allowed to freely set the user name, and the user name is stored in the preset data memory 35, the stored data memory 34, or the like of the body of the game apparatus 1.

Initially, each game apparatus 1 displays, on, for example, the lower LCD 12, information for inquiring of a user whether an in-body storage memory (for example, the stored data memory 34) is to be used or a memory card (for example, the memory card 28) is to be used (FIG. 4). The user of the game apparatus 1 performs touch operation for selecting from among options displayed on the lower LCD 12 through the touch panel 13, thereby allowing the user to select a storage medium to be used.

Next, each game apparatus 1 displays, on, for example, the lower LCD 12, information for inquiring of a user whether a photograph is transmitted to another game apparatus, or a photograph is received from another game apparatus (FIG. 5). When the user of the game apparatus 1 performs touch operation for selecting from among options displayed on the lower LCD 12 through the touch panel 13, the user is allowed to determine whether his/her game apparatus is to act as a transmitter (for example, the transmission-end game apparatus 1t1, 1t2, or 1t3) or as a receiver (for example, the reception-end game apparatus 1r1, 1r2, or 1r3).

Figure 6:
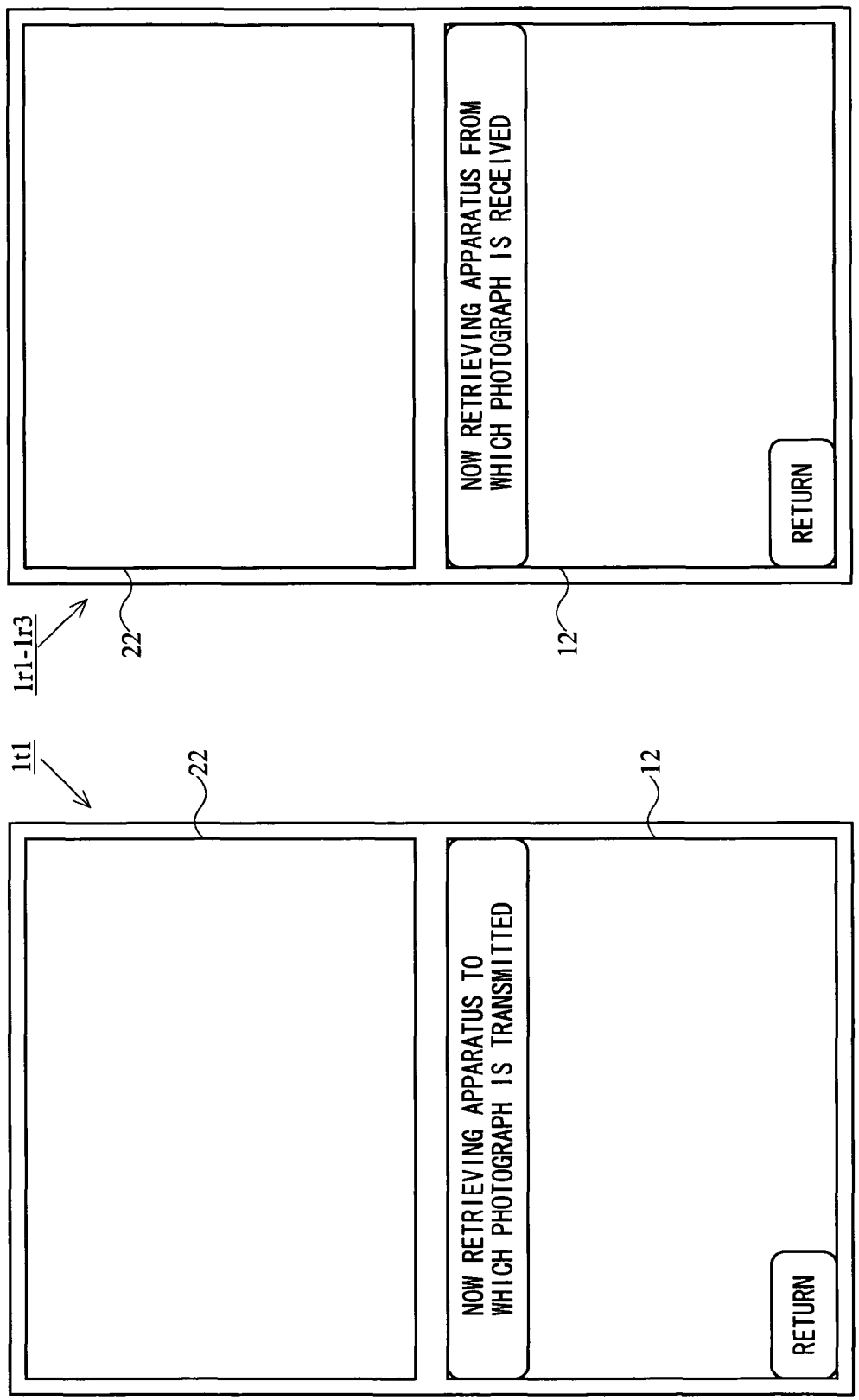
FIG. 6 is a diagram illustrating exemplary screen displays displayed, in the first stage, on the lower LCD 12 and the upper LCD 22 of each of a transmission-end game apparatus 1t1, and reception-end game apparatuses 1r1 to 1r3.
Figure 7:
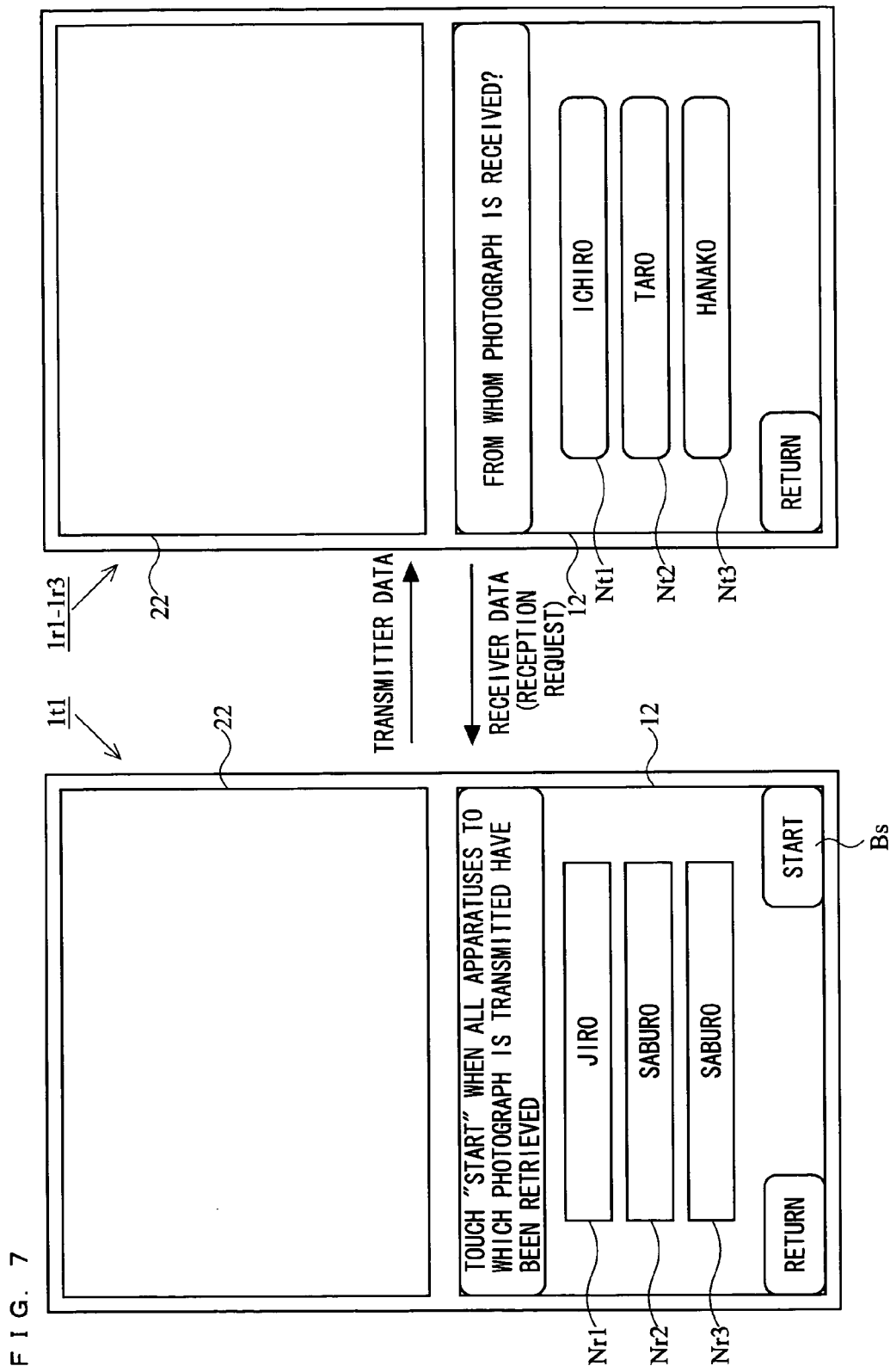
FIG. 7 is a diagram illustrating exemplary screen displays displayed, in the second stage, on the lower LCD 12 and the upper LCD 22 of each of the transmission-end game apparatus 1t1, and the reception-end game apparatuses 1r1 to 1r3.

The reception-end game apparatuses 1r1 to 1r3 each display, on, for example, the lower LCD 12, information (for example, character information indicating that "now retrieving an apparatus from which a photograph is received") indicating that the game apparatus 1t acting as a transmitter is being currently retrieved, until the transmitter data is received from the transmission-end game apparatus 1t (the right drawing of FIG. 6). On the other hand, the transmission-end game apparatus 1t1 displays, on, for example, the lower LCD 12, information (for example, character information indicating that "now retrieving an apparatus to which a photograph is transmitted") indicating that the game apparatus 1r acting as a receiver is being currently retrieved, while the transmitter data is being transmitted, and a request for receiving image data is being collected from the reception-end game apparatus 1 (the left drawing of FIG. 6).

Next, when the reception-end game apparatuses 1r1 to 1r3 each receive the transmitter data from the transmission-end game apparatuses 1t1 to 1t3, the reception-end game apparatuses 1r1 to 1r3 each display, on, for example, the lower LCD 12, information indicating the user names of the transmission-end game apparatus 1t from which the transmitter data have been received. For example, user names Nt1 to Nt3 of the transmission-end game apparatuses 1t1 to 1t3, respectively, are displayed on the lower LCD 12 of each of the reception-end game apparatuses 1r1 to 1r3 as shown in an example in the right drawing of FIG. 7. A user of each of the reception-end game apparatuses 1r1 to 1r3 performs touch operation for touching one of the user names Nt1 to Nt3 displayed on the lower LCD 12, through the touch panel 13, so that the user is allowed to select one of the transmission-end game apparatuses 1t1 to 1t3 as a transmitter. When the user of each of the reception-end game apparatuses 1r1 to 1r3 has selected a transmitter, the reception-end game apparatuses 1r1 to 1r3 each transmit the receiver data representing reception request, to the selected one of the transmission-end game apparatuses 1t1 to 1t3.

On the other hand, when the transmission-end game apparatus 1t1 receives the receiver data from the reception-end game apparatuses 1r1 to 1r3, information indicating the user names of the game apparatus 1r acting as a receiver from which the receiver data have been received, are displayed on, for example, the lower LCD 12. In the example shown in the left drawing of FIG. 7, the transmission-end game apparatus 1t1 displays, on the lower LCD 12 of the transmission-end game apparatus 1t1, user names Nr1 to Nr3 of the reception-end game apparatuses 1r1 to 1r3, respectively, each of which is making reception request. In the present embodiment, the transmission-end game apparatus 1t1 has no right to select a reception-end apparatus from among a plurality of the reception-end game apparatuses 1r1 to 1r3 displayed, and is only allowed to determine whether transmission of image data to all the reception-end game apparatuses 1r1 to 1r3 displayed is performed or no transmission is performed. For example, when a user of the transmission-end game apparatus 1t1 performs touch operation for touching, through the touch panel 13, an operation button icon Bs representing "start" displayed on the lower LCD 12, the process shifts to an image transmission process.

Next, the transmission-end game apparatus 1t1 selects an image to be transmitted, from among images stored in a memory (for example, the stored data memory 34) in the body of the game apparatus 1t1 or a memory card (for example, the memory card 28). Although an image photographed by the game apparatus 1t1 is typically transmitted, another image (for example, an image received from another apparatus, or a stored image other than a photographed image) may be transmitted. For example, in an example shown in the left drawing of FIG. 8, thumbnail images of images stored in the stored data memory 34 or the memory card 28 of the game apparatus 1t1 are displayed in a thumbnail display area At on the lower LCD 12. Further, the thumbnail display area At in which the thumbnail images are displayed are scrolled rightward or leftward by performing touch operation for touching a scroll button icon Bl or Br trough the touch panel 13, so as to display the thumbnail images. A user of the transmission-end game apparatus 1t1 is allowed to enclose a thumbnail image by a cursor C displayed on the lower LCD 12 so as to select the thumbnail image as an image to be transmitted. At this time, a thumbnail image IM (that is, an image to be transmitted) enclosed by the cursor C is displayed on the upper LCD 22. When the user of the transmission-end game apparatus 1t1 performs touch operation for touching, through the touch panel 13, an operation button icon Bt representing "transmit" displayed on the lower LCD 12, image data of the image IM which is currently selected as an image to be transmitted can be transmitted. When the user of the transmission-end game apparatus 1t1 performs touch operation for touching, through the touch panel 13, an operation button icon Bf representing "end" displayed on the lower LCD 12, the image transmission process can be ended.

Figure 8:
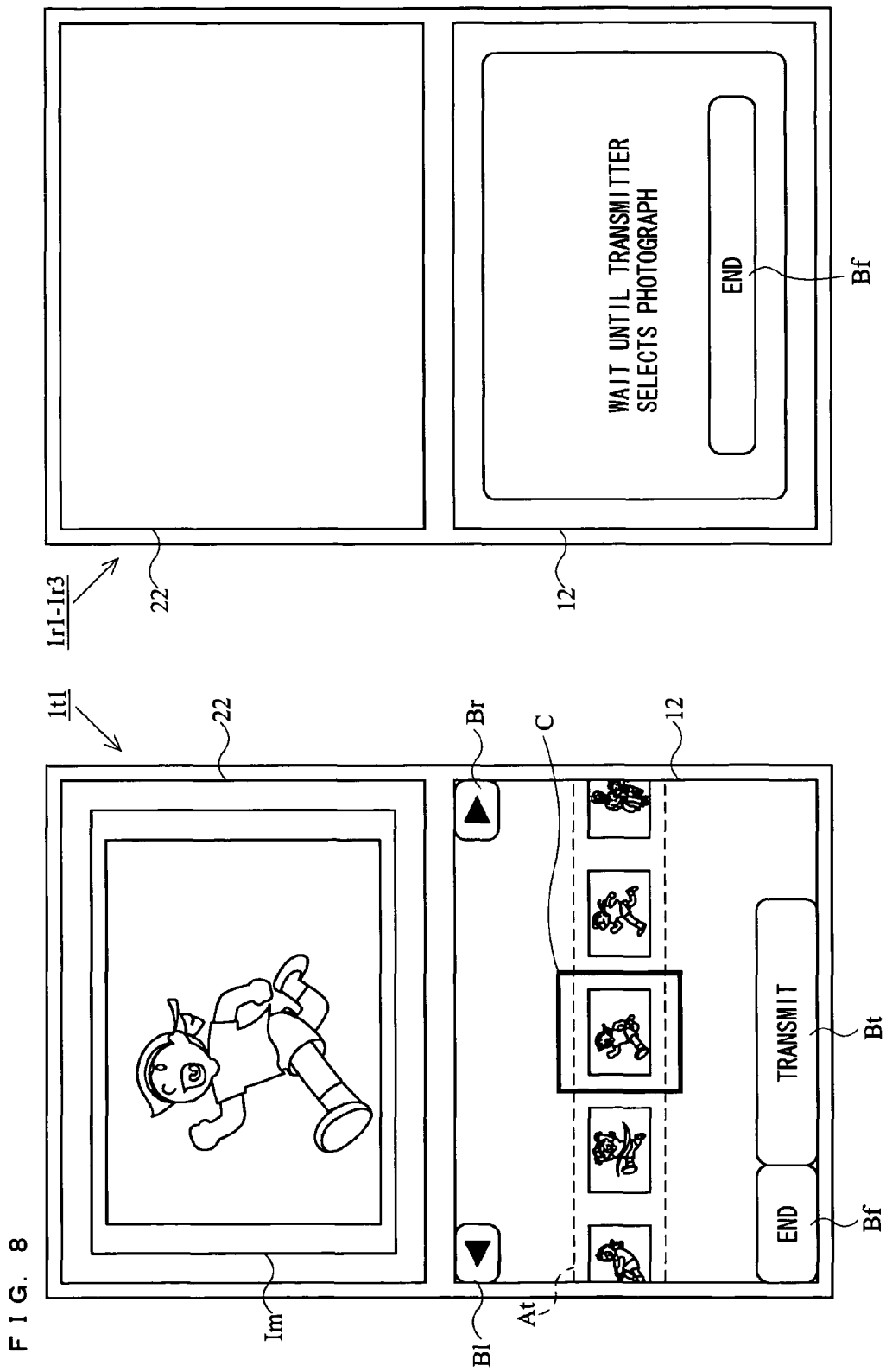
FIG. 8 is a diagram illustrating exemplary screen displays displayed, in the third stage, on the lower LCD 12 and the upper LCD 22 of each of the transmission-end game apparatus 1t1, and the reception-end game apparatuses 1r1 to 1r3.

On the other hand, the reception-end game apparatuses 1r1 to 1r3 each display, on, for example, the lower LCD 12, information (for example, character information indicating that "wait until the transmitter selects a photograph") indicating that a user of the transmission-end game apparatus 1t1 is selecting an image, while the user of the transmission-end game apparatus 1t1 is selecting an image to be transmitted (the right drawing of FIG. 8).

Next, the transmission-end game apparatus 1t1 outputs, to each of the reception-end game apparatuses 1r1 to 1r3, image data of the image IM selected, as an image to be transmitted, from among images stored in the memory in the body of the game apparatus 1t1 or the memory card. At this time, the transmission-end game apparatus 1t1 displays, on the lower LCD 12 and/or the upper LCD 22 of the transmission-end game apparatus 1t1, information indicating that the image IM selected by the game apparatus 1t1 is being transmitted to each of the reception-end game apparatuses 1r1 to 1r3. For example, as shown in the left drawing of FIG. 9, the image IM being transmitted is displayed on the upper LCD 22, and character information indicating that "now transmitting the photograph" is displayed on the lower LCD 12.

Figure 9:
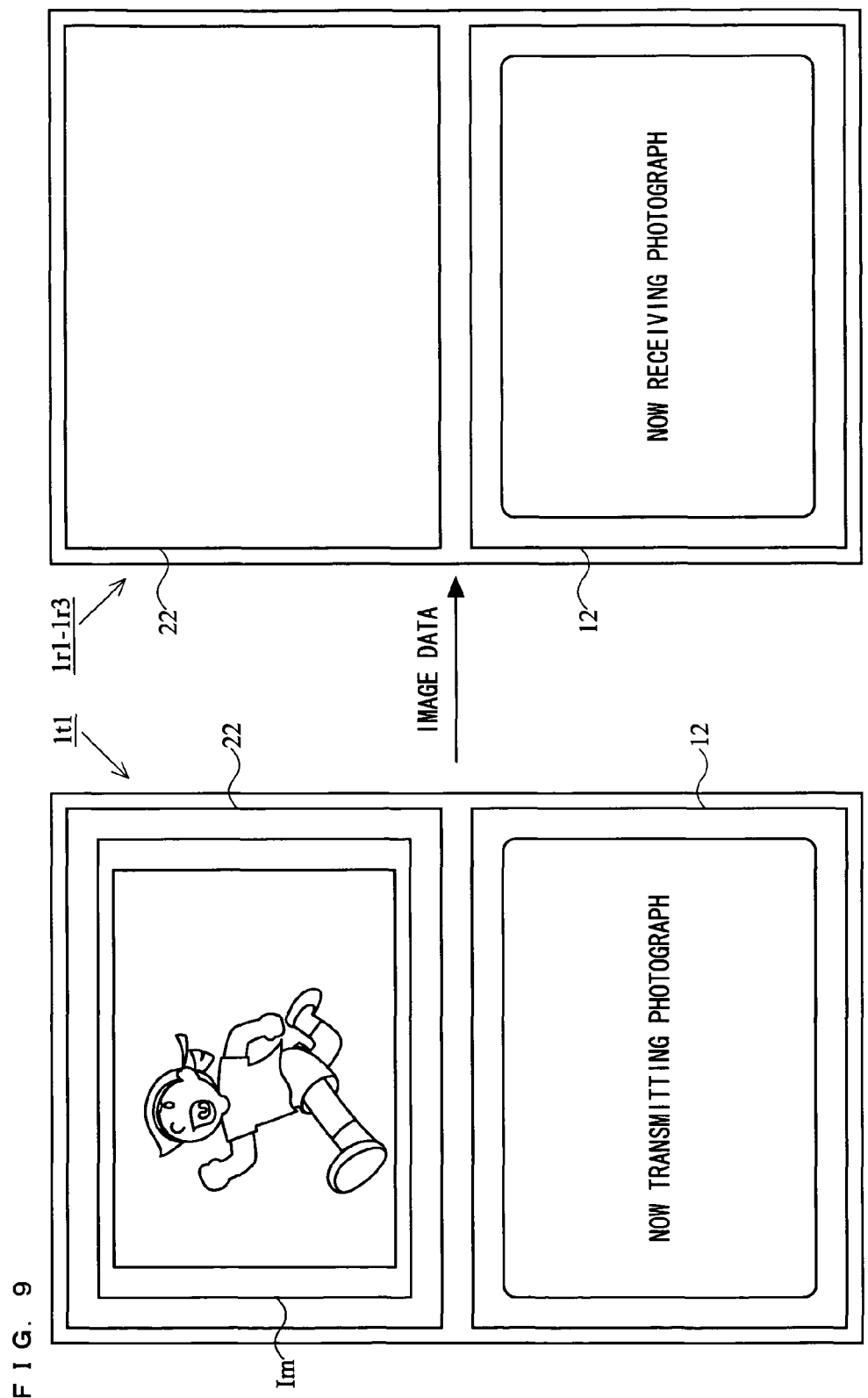
FIG. 9 is a diagram illustrating exemplary screen displays displayed, in the fourth stage, on the lower LCD 12 and the upper LCD 22 of each of the transmission-end game apparatus 1t1, and the reception-end game apparatuses 1r1 to 1r3.
Figure 10:
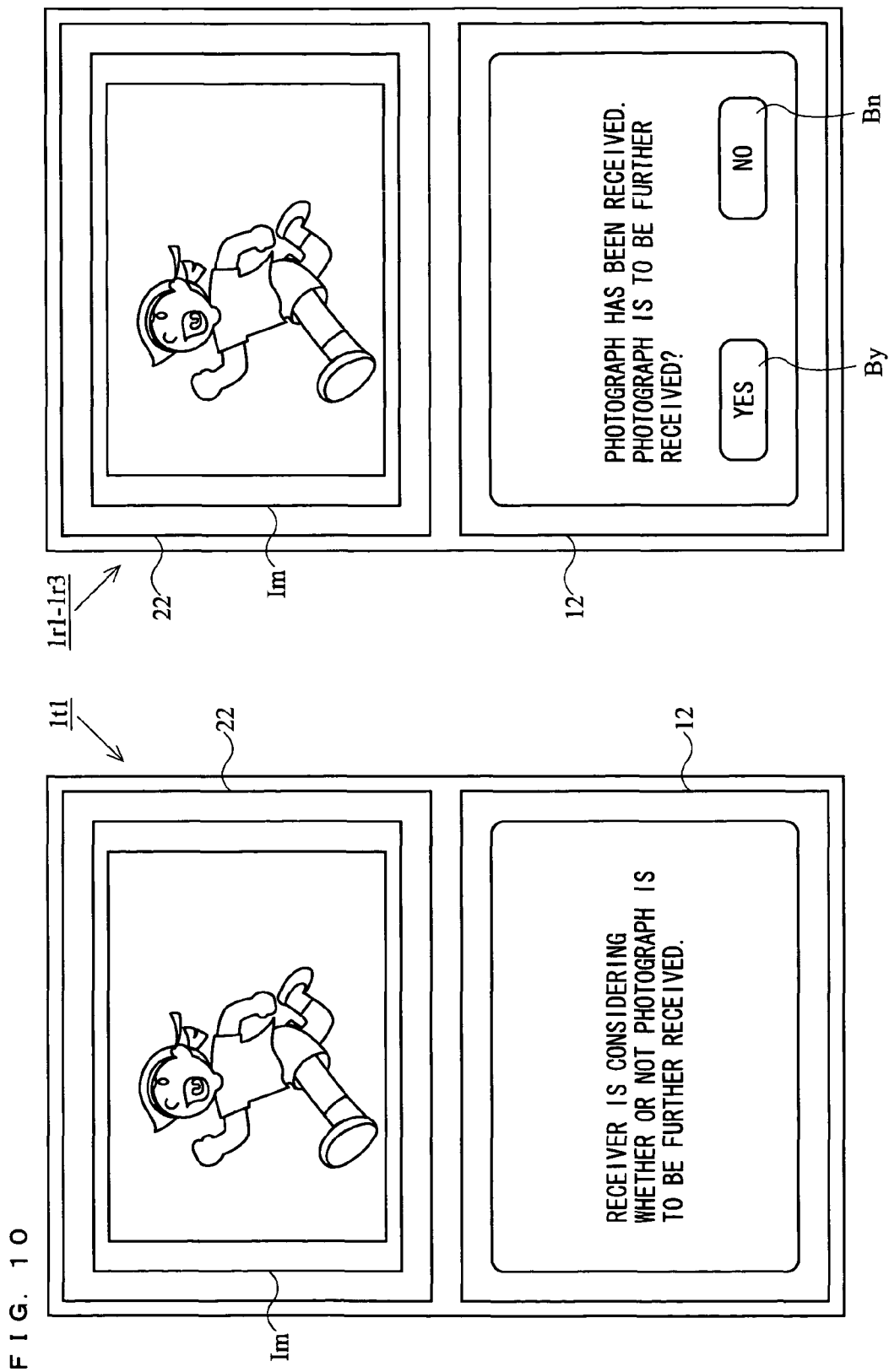
FIG. 10 is a diagram illustrating exemplary screen displays displayed, in the fifth stage, on the lower LCD 12 and the upper LCD 22 of each of the transmission-end game apparatus 1t1, and the reception-end game apparatuses 1r1 to 1r3.

On the other hand, the reception-end game apparatuses 1r1 to 1r3 display, on, for example, the lower LCD 12, information (for example, character information indicating that, for example, "now receiving the photograph") indicating that the image data is being received from the transmission-end game apparatus 1t1, while the image data is being transmitted from the transmission-end game apparatus 1t1 (the right drawing of FIG. 9).

Next, when the reception-end game apparatuses 1r1 to 1r3 complete the reception of the image data transmitted from the transmission-end game apparatus 1t1, the reception-end game apparatuses 1r1 to 1r3 each display, on, for example, the upper LCD 22, the image IM represented by the image data received from the transmission-end game apparatus 1t1, and help a user to determine whether or not image data is to be further received from the game apparatus 1t1. For example, as shown in the right drawing of FIG. 10, the image IM having been received is displayed on the upper LCD 22, and character information indicating that "the photograph has been received. A photograph is to be further received?" is displayed on the lower LCD 12. When a user of each of the reception-end game apparatuses 1r1 to 1r3 performs touch operation for touching, through the touch panel 13, an operation button icon By displayed on the lower LCD 12 so as to represent "YES", the user is allowed to request further reception of image data from the transmission-end game apparatus 1t1. In this case, the reception-end game apparatuses 1r1 to 1r3 each display the screen as shown in the right drawing of FIG. 8, and waits until a user of the transmission-end game apparatus 1t1 selects again an image to be transmitted. Further, when the user of each of the reception-end game apparatuses 1r1 to 1r3 perform touch operation for touching, through the touch panel 13, an operation button icon Bn displayed on the lower LCD 12 so as to represent "NO", the following reception of image data can be stopped so as to end communication with the transmission-end game apparatus 1t1.

On the other hand, when the transmission-end game apparatus 1t1 completes transmission of the image data to the reception-end game apparatuses 1r1 to 1r3, the image 1M having been transmitted is displayed on, for example, the upper LCD 22, and information indicating that the reception-end game apparatuses 1r1 to 1r3 are determining whether or not image data is to be further received is displayed. For example, as shown in the left drawing of FIG. 10, the image IM having been transmitted is displayed on the upper LCD 22, and character information indicating that "the reception-end apparatus is still considering whether or not an photograph is to be further received" is displayed on the lower LCD 12. When information indicating whether or not the image data is to be further received is obtained from all the reception-end game apparatuses 1r1 to 1r3, and the reception request for requesting further reception of image data is received from at least one of the reception-end game apparatuses 1r1 to 1r3, the screen as shown in the left drawing of FIG. 8 is displayed, and the user of the transmission-end game apparatus 1t1 is allowed to select again an image to be transmitted.

When users of the transmission-end game apparatus 1t1 and/or the reception-end game apparatuses 1r1 to 1r3 perform operation for ending the image transmission process, information inquiring of a user whether or not a photograph is to be transmitted to another game apparatus or a photograph is to be received from another game apparatus as shown in FIG. 5 is displayed on, for example, the lower LCD 12 of each game apparatus 1, and the process described above is repeated. When all the reception-end game apparatuses 1r1 to 1r3 end the reception, the transmission-end game apparatus 1t1 displays information indicating that the communication is stopped, or when the transmission-end game apparatus 1t1 ends the transmission, the reception-end game apparatuses 1i1 to 1r3 each display information indicating that the communication is stopped. For example, as shown in the left drawing and the right drawing of FIG. 11, when the communication is stopped, the transmission-end game apparatus 1t1 and the reception-end game apparatuses 1r1 to 1r3 each display character information indicating that "communication is stopped", on, for example, the lower LCD 12. When the user of each of the transmission-end game apparatus 1t1 and the reception-end game apparatuses 1r1 to 1r3 performs touch operation for touching, through the touch panel 13, an operation button icon By displayed on the lower LCD 12 so as to represent "YES", the process is returned to an initial stage of the image transmission process, and the image transmission process is renewed.

Figure 12:
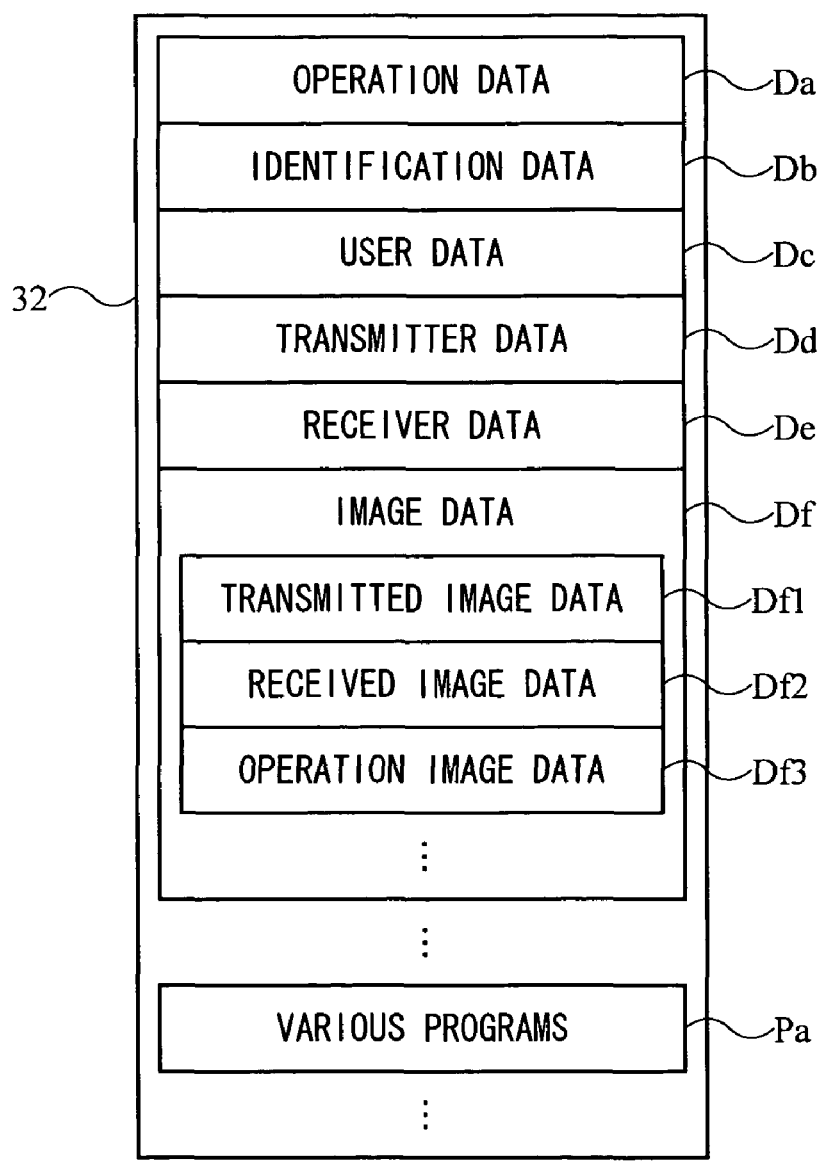
FIG. 12 is a diagram illustrating an example of various data to be stored in a main memory 32 in accordance with an image communication program being executed.

Next, before a process operation performed by the game apparatus 1 will be described, various data to be used for executing the image communication program will be described with reference to FIG. 12. FIG. 12 is a diagram illustrating an example of various data stored in the main memory 32 in accordance with the image communication program being executed.

In FIG. 12, the main memory 32 stores programs loaded from the memory cards 28 and 29, and the stored data memory 34, and temporary data generated in the process. In FIG. 12, operation data Da, identification data Db, user data Dc, transmitter data Dd, receiver data De, image data Df, and the like are stored in a data storage area of the main memory 32. Further, various programs Pa including the image communication program and the like are stored in a program storage area of the main memory 32.

The operation data Da is data (touch coordinate point data) of a touch coordinate point representing a touch position TP in a screen coordinate system of the touch panel 13 touched by a player, and data (operation button data) representing a state of a player operating the operation button 14. For example, the touch coordinate point data and the operation button data are each acquired every unit time (for example, at intervals of 1/60 seconds) in which the game apparatus 1 performs game process, and are updated and stored as the operation data Da when acquired.

The identification data Db is data representing a unique identification number for identifying the game apparatus 1. For example, data representing an own-apparatus ID which is previously set in the preset data memory 35 and the like of the game apparatus 1 is stored as the identification data Db. The own-apparatus ID may be stored as a unique serial number assigned in a manufacturing plant or as identification information generated at random in the game apparatus 1.

The user data Dc is data representing a user name which is previously set by a user of the game apparatus 1. For example, the preset data memory 35 and the like of the game apparatus 1 stores a user name having been inputted by a user, and data representing the user name is stored as the user data Dc.

The transmitter data Dd is data representing the identification number and the user name of the game apparatus 1 acting as a transmitter when image data are transmitted and received. The receiver data De is data representing the identification number and the user name of the game apparatus 1 acting as a receiver when image data are transmitted and received.

The image data Df includes transmitted image data Df1, received image data Df2, operation image data Df3, and the like. As the transmitted image data Df1, image data of an image to be transmitted to another game apparatus 1 is temporarily stored. As the received image data Df2, image data of an image received from another game apparatus 1 is temporarily stored. The operation image data Df3 is image data representing operation buttons for operating the game apparatus 1, and image data representing information to be informed to a user.

Figure 13:
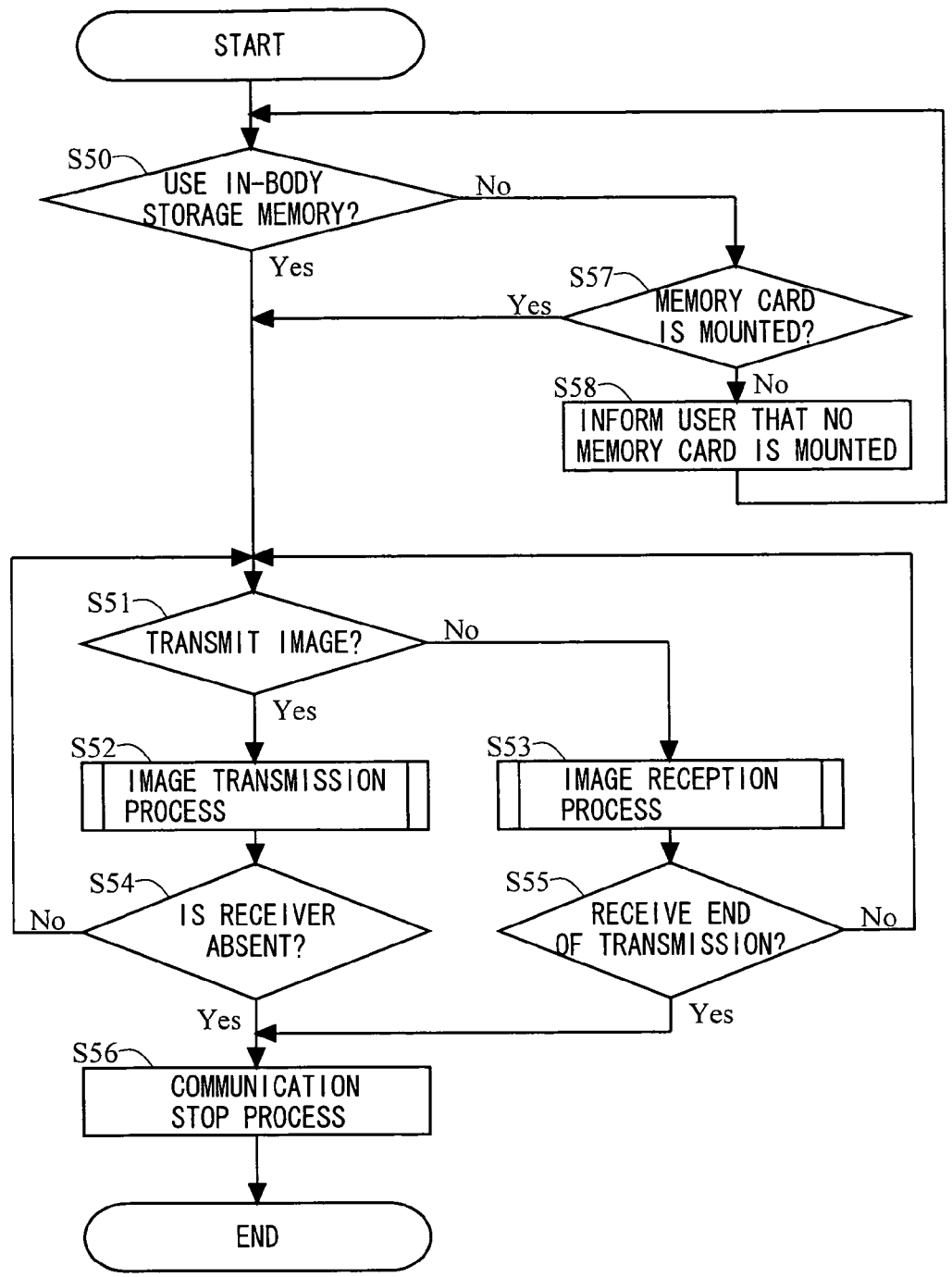
FIG. 13 is a flow chart showing an exemplary flow in which the game apparatus 1 shown in FIG. 1 performs image communication process by executing the image communication program.
Figure 14:
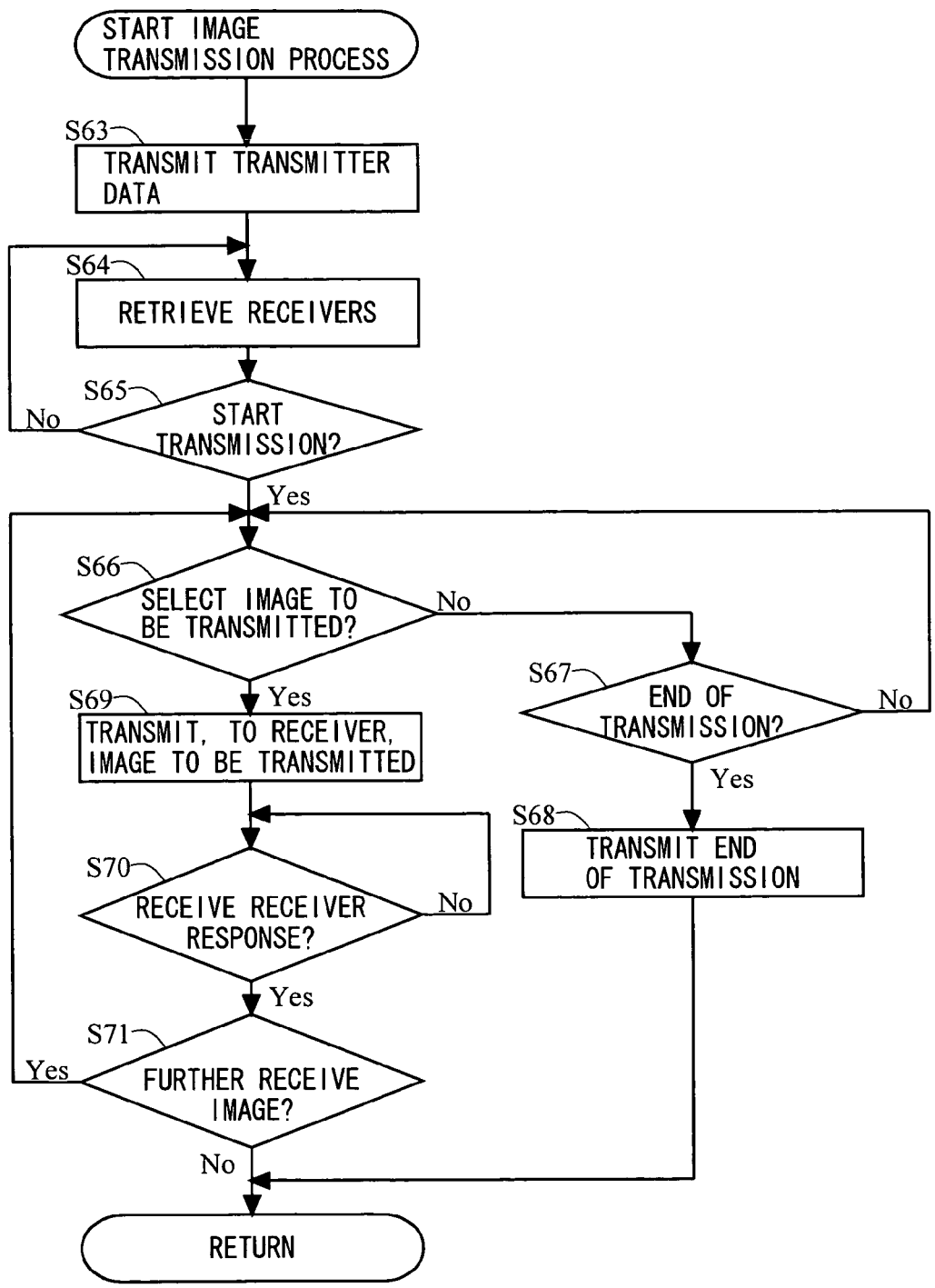
FIG. 14 illustrates a subroutine showing in detail an operation of an image transmission process of step 52 shown in FIG. 13.
Figure 15:
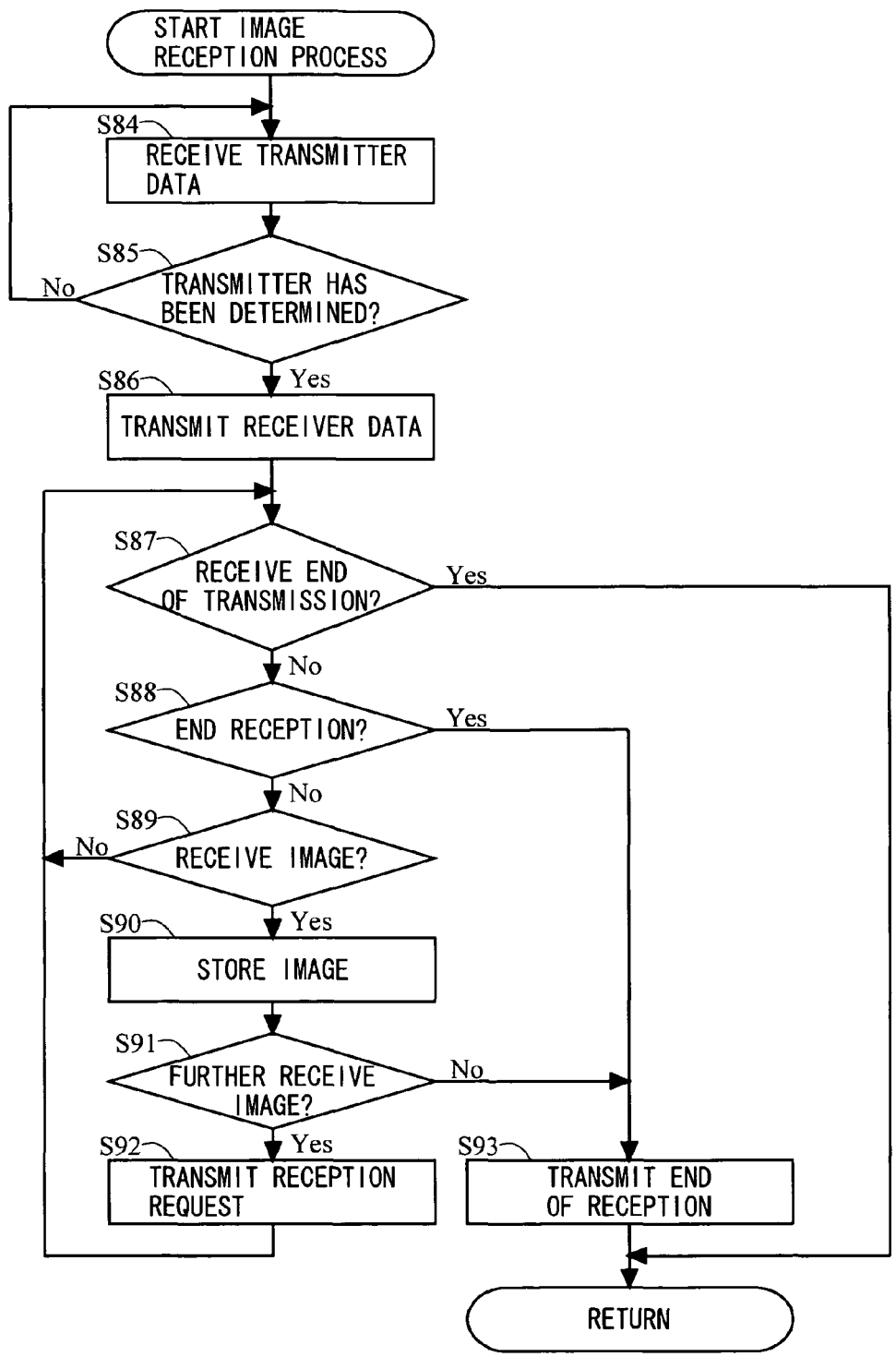
FIG. 15 illustrates a subroutine showing in detail an operation of an image reception process of step 53 shown in FIG. 13.
Figure 16:
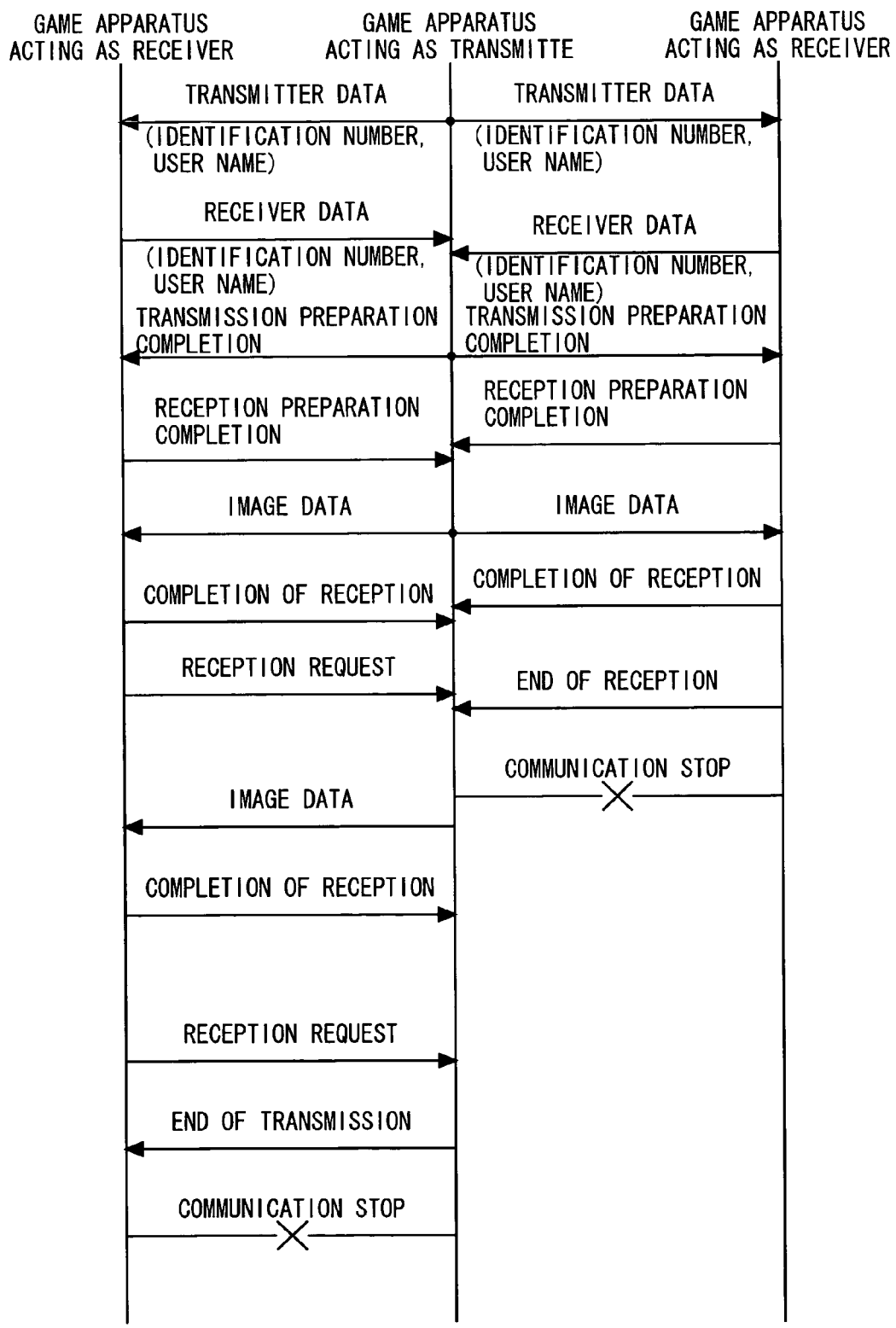
FIG. 16 is a diagram illustrating an exemplary signal transmitted and received between a game apparatus 1t acting as a transmitter and a game apparatus 1r acting as a receiver.

Next, a specific process operation performed by the game apparatus 1 executing the image communication program will be descried with reference to FIGS. 13 to 16. FIG. 13 is a flow chart showing an exemplary flow in which the game apparatus 1 performs image communication process by executing the image communication program. FIG. 14 illustrates a subroutine showing in detail an operation of an image transmission process performed in step 52 of FIG. 13. FIG. 15 illustrates a subroutine showing in detail an operation of an image reception process performed in step 53 of FIG. 13. FIG. 16 is a diagram illustrating exemplary signals which are transmitted and received between the game apparatus 1*t* acting as a transmitter and the game apparatus 1*r* acting as a receiver. A program for performing the process is included in a program stored in the stored data memory 34, and when the game apparatus 1 is powered on, the program is read from the stored data memory 34 to the main memory 32 through the memory control circuit 33, and executed by the CPU 31. Although in the present embodiment the image communication program is previously stored in the stored data memory 34, the program may be downloaded to the game apparatus 1 through the Internet, and the like. Further, the program may be read from a program stored in the memory card 28 or the memory card 29, and executed.

Firstly, when a power source (the power button 14F) of the game apparatus 1 becomes ON, the CPU 31 executes a boot program (not shown), so that a launcher program which is stored in the stored data memory 34 and selectively executes a plurality of application programs is loaded into the main memory 32, and the CPU 31 executes the launcher program. Thereafter, an image communication application is selected and executed on the launcher program, so that the image communication program is loaded into the main memory 32. The loaded image communication program is executed by the CPU 31.

The image communication program according to the present embodiment includes not only an image communication function, but also a photographing function, and a photographed image display function of displaying a photographed image. A user is allowed to selectively execute a function, among the functions, through an operation using the touch panel and the buttons. When the photographing function is selected, a video taken by the camera which is currently selected from the inner camera 23 and the outer camera 25 is displayed on the lower LCD 12 in real time. When in this state the L button 14I or the R button 14J is operated, the photographing process is performed so as to store the photographed image in a storage medium selected from the in-body storage memory (for example, the stored data memory 34), or a memory card (for example, the memory card 28). Immediately after the photographing, the photographed image may be displayed on the lower LCD 12. Further, when the photographed image display function is selected, images desired by a user, among the photographed images stored in the storage medium selected from the in-body storage memory or the memory card, may be displayed one by one or a list of the images desired by the user thereamong may be displayed. Further, a user selects, before selecting from among the functions, whether the in-body storage memory is to be used or the memory card is to be used, and the photographed image is stored in the selected storage means when the photographing function is executed, and an image to be displayed is read from the selected storage means when the photographed image display function is executed. An image to be transmitted from the transmission-end apparatus when the image communication function is executed is read from the selected storage means, and an image received by the reception-end apparatus is stored in the selected storage means. When a user selects and executes the image communication function, the process steps of step 51 and the following steps shown in FIG. 13 are performed. In FIGS. 13 to 15, step is abbreviated as "S".

In FIG. 13, the CPU 31 determines whether an in-body memory (for example, the stored data memory 34) is to be used in the following process steps, or a memory card (for example, the memory card 28) is to be used in the following process steps, based on the operation data Da (step 50). For example, a display is performed, on the lower LCD 12 and/or the upper LCD 22 of the game apparatus 1, so as to help a user to select whether the in-body storage memory is to be used or the memory card is to be used (see FIG. 4). The CPU 31 determines a storage medium to be used, in accordance with the user performing an operation for selecting from among the options. The CPU 31 advances the process to step 57 when the memory card is to be used. On the other hand, the CPU 31 advances the process to step 51 when the in-body storage memory is to be used.

In step 57, the CPU 31 determines whether or not the memory card (for example, the memory card 28) used for storing an image in the game apparatus 1 is mounted to a connector of the game apparatus 1. When the memory card is mounted to the connector of the game apparatus 1, the CPU 31 advances the process to step 51. On the other hand, when the memory card is not mounted to the connector of the game apparatus 1, the CPU 31 displays, on the lower LCD 12 and/or the upper LCD 22, information for helping a user to mount the memory card (step 58), and returns the process to step 50 and repeats the process.

In step 51, the CPU 31 determines, based on the operation data Da, whether an image is to be transmitted to another game apparatus 1*r* in the following process steps, or an image is to be received from another game apparatus 1*r* in the following process steps. For example, display is performed, on the lower LCD 12 and/or the upper LCD 22 of the game apparatus 1, so as to help a user to select whether or not a photograph is to be transmitted to another game apparatus 1*r*, or a photograph is to be received from another game apparatus 1*t* (see FIG. 5). The CPU 31 determines whether an image is to be transmitted to another game apparatus 1*r* or an image is to be received from another game apparatus 1*t*, in accordance with a user performing an operation for selecting from among the options. When an image is to be transmitted to another game apparatus 1*r*, the CPU 31 advances the process to step 52. On the other hand, when an image is to be received from another game apparatus 1t, the CPU 31 advances the process to step 53.

In step 52, the CPU 31 performs image transmission process, and advances the process to step 54. Hereinafter, the image transmission process of step 52 will be described in detail with reference to FIG. 14.

In FIG. 14, the CPU 31 performs broadcast transmission of transmitter data indicating that the own apparatus is a transmitter of image data by using, for example, the local communication module 39 (step 63), and the advances the process to the following step. For example, the CPU 31 generates the transmitter data by using data representing the identification number and the user name stored as the identification data Db and the user data Dc, respectively, and stores the generated data as the transmitter data Dd. The broadcast transmission of the transmitter data stored as the transmitter data Dd is performed such that another game apparatus 1r capable of receiving the transmitter data is informed that the game apparatus 1 acts as a transmitter (see FIG. 16).

Next, the CPU 31 retrieves another game apparatus 1r acting as a receiver (step 64), and advances the process to the following step. As described below in detail, another game apparatus 1r acting as the receiver selects the game apparatus 1t acting as a transmitter from which the another game apparatus 1r desires to receive image, based on the received transmitter data. The receiver data indicating that the another game apparatus 1r acts as the receiver of image data is transmitted to the selected game apparatus It acting as the transmitter (see FIG. 16). In step 64, the CPU 31 waits until the receiver data is received through, for example, the local communication module 39. The CPU 31 updates, when the receiver data is received, the receiver data De so as to include the identification number and the user name, represented by the receiver data, of the another game apparatus 1r acting as the receiver. While the another game apparatus 1r acting as the receiver is being retrieved, the CPU 31 displays, on, for example, the lower LCD 12, information indicating that the game apparatus 1r acting as the receiver is being currently retrieved (see the left drawing of FIG. 6). Further, when the receiver data is received from the another game apparatus 1r acting as the receiver, the CPU 31 displays, on, for example, the lower LCD 12, information (see the user names Nr1 to Nr3 in the left drawing of FIG. 7) indicating the user names, represented by the receiver data, of the another game apparatus 1r acting as the receiver.

Next, the CPU 31 determines, based on the operation data Da, whether or not a process for transmitting an image to the another game apparatus 1r, acting as the receiver, having been retrieved, is to be started (step 65). For example, the CPU 31 performs display (operation button icon Bs) on the lower LCD 12 and/or the upper LCD 22 so as to help a user to perform an operation for starting the transmission of an image. When the user performs the operation for starting the transmission of an image, it is determined that the process is to be started, and the process is advanced to step 66. On the other hand, when the process for transmitting an image is not started, the CPU 31 returns the process to step 64, and continues to retrieve another game apparatus 1r acting as the receiver.

In a period from determination of start of transmission of an image to determination of an image to be transmitted, the game apparatus 1t acting as the transmitter transmits transmission preparation completion data indicating that transmission to the game apparatus 1r acting as the receiver is ready. On the other hand, when the game apparatus 1r acting as the receiver is ready to receive image data, the game apparatus 1r acting as the receiver transmits the reception preparation completion data indicating that reception of image data is ready, to the game apparatus 1t acting as the transmitter, in response to the reception of the transmission preparation completion data (see FIG. 16).

In step 66, the CPU 31 determines, based on the operation data Da, whether or not an image to be transmitted to the another game apparatus 1r is selected. For example, the CPU 31 displays, on the lower LCD 12 and/or the upper LCD 22, a screen for allowing a user to select an image to be transmitted to the another game apparatus 1r (see the left drawing of FIG. 8), so as to help the user to select an image to be transmitted. The CPU 31 advances the process to step 69 when a user performs an operation (for example, touch operation for touching the operation button icon Bt) for determining an image to be transmitted. On the other hand, the CPU 31 advances the process to step 67 when the user does not perform the operation for determining an image to be transmitted (No in step 66).

In step 69, the CPU 31 transmits, to the another game apparatus 1r acting as the receiver, image data representing the image which is selected in step 66 so as to be transmitted, and advances the process to the following step. For example, the CPU 31 extracts, from the storage medium selected in step 50, the image data corresponding to the image which is selected in step 66 so as to be transmitted, and stores the extracted image data as the transmitted image data Df1. The CPU 31 identifies, based on the receiver data De, the another game apparatus 1r which is currently acting as the receiver, and transmits the image data stored as the transmitted image data Df1, to the identified game apparatus 1r through, for example, the local communication module 39 (see FIG. 16). While the image data is being transmitted to the another game apparatus 1r acting as the receiver, the CPU 31 displays, on, for example, the lower LCD 12, information indicating that the image data is being transmitted to the game apparatus 1r which is currently acting as the receiver (see the left drawing of FIG. 9).

Next, the CPU 31 waits until a receiver response transmitted from each game apparatus 1r acting as the receiver is received (step 70). The receiver response represents a request (reception request) for requesting further reception of image data, or a response (end of reception) for ending the reception. After receiving the image data, each game apparatus 1r acting as the receiver transmits either one of the request or the response to the game apparatus 1t acting as the transmitter (see FIG. 16). The CPU 31 waits until the receiver responses are received from all the game apparatus 1r which are currently acting as the receivers, and the CPU 31 returns the process to step 66 and repeats the process when the reception request is received from at least one game apparatus 1r acting as the receiver (Yes in step 71). On the other hand, the CPU 31 waits until the receiver responses are received from all the game apparatus 1r which are currently acting as the receivers, and the CPU 31 ends the process of the subroutine when the end of reception is informed by all the game apparatus 1r acting as the receivers (No in step 71). The CPU 31 eliminates, from the receiver data De, data of the game apparatus 1r acting as the receiver, when the CPU 31 is informed of the end of reception by the game apparatus 1r acting as the receivers. Further, while the receiver response from the another game apparatus 1r acting as the receiver is being awaited, the CPU 31 displays, on, for example, the lower LCD 12, information indicating that the receiver response from the game apparatus 1r which is currently acting as the receiver is being awaited (see the left drawing of FIG. 10).

On the other hand, when the user does not perform the operation for determining an image to be transmitted in step 66, the CPU 31 determines, base on the operation data Da, whether or not the process for transmitting an image is to be ended (step 67). For example, the CPU 31 determines whether or not the process for transmitting an image is to be ended, in accordance with a user's operation (for example, touch operation for touching the operation button icon Bf). When the process for transmitting an image is to be ended, the CPU 31 transmits data (end of transmission; see FIG. 16) indicating that the transmission is ended, to each game apparatus 1*r* which is currently acting as the receiver (step 68), and ends the process of the subroutine. On the other hand, the CPU 31 returns the process to step 66, and repeats the process when the process for transmitting an image is not to be ended.

Returning to FIG. 13, following the image transmission process of step 52, the CPU 31 determines whether or not no receiver exists (step 54). For example, the CPU 31 determines that no receiver exists when the determination of step 71 represents No (that is, end of reception is informed by all the game apparatus 1*r* acting as the receivers). When no receiver exists, the CPU 31 advances the process to step 56. On the other hand, the CPU 31 ends the communication with the game apparatus 1*r* acting as the receiver when the determination of step 67 represents Yes (that is, when the user selects the end of transmission), and returns the process to step 51 and repeats the process.

The CPU 31 performs an image reception process in step 53, and advances the process to step 55. Hereinafter, an operation of the image reception process of step 53 will be described in detail with reference to FIG. 15.

In FIG. 15, the CPU 31 receives the transmitter data indicating a transmitter of image data (step 84), and advances the process to the following step. As described above, the game apparatus 1*t* acting as a transmitter performs broadcast transmission of the transmitter data indicating that the game apparatus 1*t* is a transmitter of image data, by using, for example, the local communication module 39 (see FIG. 16). In step 84, when the CPU 31 receives the transmitter data transmitted by broadcast transmission, the CPU 31 knows that another game apparatus 1*t* acts as a transmitter. When the CPU 31 receives the transmitter data, the CPU 31 acquires the identification number and the user name, represented by the transmitter data, of the game apparatus 1*t* acting as the transmitter, and stores the identification number and the user name as the transmitter data Dd.

While another game apparatus 1*t* acting as a transmitter is being retrieved, the CPU 31 displays, on, for example, the lower LCD 12, information indicating that the game apparatus 1*t* acting as a transmitter is being currently retrieved (see the right drawing of FIG. 6). Further, when the transmitter data is received from the another game apparatus 1*t* acting as the transmitter, the CPU 31 displays, on, for example, the lower LCD 12, information indicating the user names of the another game apparatus 1*t* which is acting as the transmitter and is represented by the transmitter data (see the right drawing of FIG. 7).

Next, the CPU 31 determines, based on the operation data Da, whether or not a transmitter is selected from among the another game apparatus 1*t* which acts as the transmitter and has been retrieved (step 85). For example, the CPU 31 performs display on the lower LCD 12 and/or the upper LCD 22 so as to help selection from among information indicating the user names of the another game apparatus 1*t* acting as the transmitter (see the user names Nt1 to Nt3 in the right drawing of FIG. 7). In accordance with a user performing an operation for selecting one of the user names, the selected user is determined as a transmitter from which an image is to be received, and the process is advanced to step 86. On the other hand, when a transmitter from which an image is to be received is not determined, the CPU 31 returns the process to step 84, and continues to retrieve another game apparatus 1*t* acting as the transmitter.

In step 86, the CPU 31 transmits receiver data indicating that the own apparatus is a receiver of image data, to the another game apparatus 1*t* which is acting as the transmitter and has been selected, by using for example, the local communication module 39, and advances the process to the following step. For example, the CPU 31 generates the receiver data by using the identification number and the user name stored as the identification data Db and the user data Dc, respectively, and stores the generated data as the receiver data De. When the receiver data stored as the receiver data De is transmitted to the another game apparatus 1*t* acting as the transmitter, the another game apparatus 1*t* which acts as the transmitter and receives the receiver data is informed of the game apparatus 1 acting as a receiver and the user name thereof (see FIG. 16).

In a period from determination of start of transmission of an image to determination of an image to be transmitted, the another game apparatus 1*t* acting as the transmitter transmits transmission preparation completion data indicating that the transmission to the game apparatus 1*r* acting as the receiver is ready. In this case, when the game apparatus 1*r* acting as the receiver is ready to receive image data, the game apparatus 1*r* acting as the receiver transmits, to the another game apparatus 1*t* acting as the transmitter, reception preparation completion data indicating that the reception of the image data is ready, in response to the reception of the transmission preparation completion data (see FIG. 16).

Next, the CPU 31 determines whether or not data indicating the end of transmission is received from the another game apparatus 1*t* acting as the transmitter (step 87). Further, the CPU 31 determines, based on the operation data Da, whether or not a user performs an operation for ending the reception (step 88). Furthermore, the CPU 31 determines whether or not the image data is received from the another game apparatus 1*t* acting as the transmitter (step 89). For example, when the another game apparatus 1*t* acting as the transmitter is selecting an image to be transmitted, the CPU 31 displays, on the lower LCD 12 and/or the upper LCD 22, a screen indicating that the transmitter is selecting a photograph (see the right drawing of FIG. 8), thereby informing a user of a current state. The CPU 31 determines that a user performs an operation for canceling the reception (Yes in step 88), in accordance with the user performing an operation (for example, touch operation for touching the operation button icon Bf) for canceling the reception of an image, and advances the process to step 93. Further, when the end of transmission is informed by the another game apparatus 1*t* acting as the transmitter (see step 68 of FIG. 14, and FIG. 16) (Yes in step 87), the CPU 31 ends the process of the subroutine. Further, when reception of image data from the another game apparatus 1*t* acting as the transmitter is started (see step 69 of FIG. 14 and FIG. 16) (Yes in step 89), the CPU 31 advances the process to step 90. On the other hand, when any of the determinations is negative (that is, when the determination of any of steps 87 to 89 represents No), the CPU 31 repeats the determinations of steps 87 to 89.

In step 90, the CPU 31 stores, as the received image data Df2, the image data (see FIG. 16) received from the another game apparatus 1*t*. The CPU 31 stores, in the storage medium selected in step 50, the image data stored as the received image data Df2, and advances the process to the following step. When the reception of the image data from the another game apparatus 1*t* is started, the CPU 31 displays, on, for example, the lower LCD 12, information indicating that the image data is being currently received from the game apparatus 1*t* acting as the transmitter, while the image data is being received (see the right drawing of FIG. 9).

Next, the CPU 31 determines, based on the operation data Da, whether or not an image is to be further received from the another game apparatus 1*t* acting as the transmitter. For example, the CPU 31 displays, on the lower LCD 12 and/or the upper LCD 22, a screen for helping a user to determine whether or not an image is to be further received from the another game apparatus 1*t* acting as the transmitter (see the right drawing of FIG. 10). The CPU 31 advances the process to step 92 in accordance with the user performing an operation (for example, touch operation for touching the operation button icon By) for requesting further reception of an image. On the other hand, the CPU 31 advances the process to step 93 in accordance with the user performing an operation (for example, touch operation for touching the operation button icon Bn) for ending the reception of an image.

In step 92, the CPU 31 transmits, to the another game apparatus 1*t* acting as the transmitter, data (reception request; see FIG. 16) for requesting further reception of image data, and returns the process to step 87, and repeats the process.

On the other hand, in step 93, the CPU 31 transmits, to the another game apparatus 1*t* acting as the transmitter, data (end of reception: see FIG. 16) indicating that the reception is to be ended, and ends the process of the subroutine. In the determination of step 88, the reception may be automatically canceled regardless of an operation performed by a user. For example, a remaining capacity of the storage medium selected in step 50 is monitored, and when the remaining capacity indicates an amount lower than a predetermined amount, a user is informed that the remaining capacity enables no image to be stored, and the process step of step 93 may be performed.

Returning to FIG. 13, after the image reception process of step 53, the CPU 31 determines whether or not the end of transmission is informed (step 55). For example, when the determination of step 87 represents Yes (that is, when the end of transmission is informed by the game apparatus 1*t* acting as the transmitter), the CPU 31 advances the process to step 56. On the other hand, when the determination of step 91 represents No (that is, when a user determines that the reception is to be ended), the CPU 31 ends communication with the game apparatus 1*t* acting as the transmitter, and returns the process to step 51 and repeats the process.

In step 56, the CPU 31 performs communication stop process, and ends the process of the flow chart. For example, the CPU 31 ends (stops) communication with the another game apparatus 1 which is currently communicating with the own apparatus, and displays, on the lower LCD 12 and/or the upper LCD 22, a screen indicating that the communication is stopped (see the left drawing or the right drawing of FIG. 11), so as to inform a user of a current state.

As described above, when the game apparatus 1 according to the present embodiment acts as a receiver of image data, the game apparatus 1 acting as the receiver is allowed to select a transmitter from which the image data is to be received. Therefore, the game apparatus 1 is allowed to select a transmission-end apparatus desired by a user and receive an image from the transmission-end apparatus when images are transmitted and received among apparatuses.

Although in the above description the game apparatus 1*r* acting, as a receiver, to receive image data has the right to select the game apparatus 1*t* acting, as a transmitter, to transmit the image data, the game apparatus 1*t* acting as the transmitter may also have the right to select the game apparatus 1*r* acting, as the receiver, to receive image data. For example, in the process of step 65 for determining the start of transmission, when a user determines the start of the transmission after the user selects the game apparatus 1*r* which is to act as a receiver, the transmitter is also allowed to select the receiver. For example, when the game apparatus 1*r* acting as a receiver selects a user corresponding to a transmitter, a check box is provided (for example, next to each of the user names Nr1 to Nr3) to each user name which represents the receiver and is to be displayed on a display screen of the game apparatus 1*t* acting as the transmitter. When a user of the game apparatus 1*t* acting as the transmitter performs touch operation for touching the check box provided for the user name of the receiver so as to check the user name, image data is transmitted to only a user corresponding to the receiver having been checked.

In the process operation described above, the game apparatus 1*r* acting as a receiver is allowed to leave, at a time desired by a user, a group in which images are transmitted and received. Further, even when an apparatus or apparatuses of the game apparatus 1*r* acting as the receiver leaves the group, while at least one apparatus of the game apparatus 1*r* acts as the receiver, the game apparatus 1*t* acting as a transmitter may continue to transmit image data. Thus, even when an apparatus or apparatuses of the game apparatus 1*r* acting as the receiver leaves the group due to the lack of the remaining storage capacity, no influence is exerted on the game apparatus 1*t* acting as the transmitter and the remaining apparatuses of the game apparatus 1*r* acting as the receiver. However, only when all apparatuses of the game apparatus 1*r* acting as the receiver request to continue the image communication, the transmission of image data may be continued, and when at least one apparatus of the game apparatus 1*r* acting as the receiver leaves the group, all the communication in the group may be ended.

Further, although in the process operation described above the game apparatus 1*t* acting as a transmitter firstly transmits the transmitter data through the broadcast transmission in which data are transmitted to the unspecified large number of receivers, the communication may be started in another manner. For example, the game apparatus 1*r* acting as a receiver firstly transmits the receiver data to the unspecified large number of transmitters, and the game apparatus 1*t* which acts as the transmitter and receives the receiver data may transmit the transmitter data. In this case, the receiver data to be firstly transmitted may not include the user name of the game apparatus 1*r* which transmits the receiver data.

Further, in the process steps described above, the game apparatus 1*r* which acts as a receiver so as to communicate with the game apparatus 1*t* acting as a transmitter is determined, and thereafter an image to be transmitted from the game apparatus 1*t* to the game apparatus 1*r* is selected. Thus, the game apparatus 1*t* acting as the transmitter is allowed to sequentially transmit images selected as images to be transmitted, to the game apparatus 1*r*, acting as the receiver, having been determined, thereby easily transmitting various images. However, when such an effect is unnecessary, an image to be transmitted may be determined in another manner. For example, the game apparatus 1*t* acting as a transmitter determines an image to be transmitted to another game apparatus 1, and thereafter determines the game apparatus 1*r* acting as a receiver. In this case, when the game apparatus 1*t* acting as the transmitter firstly transmits, to the unspecified large number of receivers, both the transmitter data and data representing an image determined as an image to be transmitted. Thus, a user of the game apparatus 1r acting as the receiver is allowed to select a transmitter from which the image data is to be received, by referring to both the user name of the transmitter and an image to be transmitted, so that information for selection is increased, and the transmitter which more fully meet the requirements can be selected.

Further, in the process steps described above, when touch operation for touching the button Bt is performed, a thumbnail image enclosed by the cursor C is selected as an image to be transmitted. That is, images are selected and transmitted one by one. However, a plurality of images may be simultaneously selected and transmitted. For example, in the left drawing of FIG. 8, when selection operation (for example, an operation for directly touching a thumbnail image) for selecting a thumbnail image displayed in the thumbnail display area At is performed, the thumbnail image is highlighted, and an image corresponding to the thumbnail image is selected. Further, the selection operation is performed multiple times, and a plurality of images are selected, and, in this state, the touch operation for touching the button Bt is performed, so that the plurality of images having been selected may be transmitted.

In the former case, images are selected and transmitted one by one, resulting in the number of images to be simultaneously transmitted being limited to one. On the other hand, in the latter case, by limiting the number of selectable images, the number of images to be simultaneously transmitted is limited to the number of selectable images. Specifically, in the latter case, a predetermined number of images or more may not be simultaneously selected. Alternatively, when the total capacity for images to be selected is greater than or equal to a predetermined capacity, the number of images to be simultaneously selected may be smaller than the number of images corresponding to the total capacity. Further, the number of images to be simultaneously transmitted may be limited regardless of the number of selectable images. In this case, the number of selectable images may be greater than the number of images to be simultaneously transmitted, and although the images are simultaneously selected, the image transmission process for transmitting the limited number of images is repeated multiple times, thereby completing the process for transmitting all the selected images. In any image selection manner/image transmission limitation manner, a user of the reception-end game apparatus 1 is allowed to stop further reception of an image while an image is being received, and determine whether or not the reception is to be continued, based on the number of received images.

Further, when the game apparatus 1t acting as a transmitter firstly transmits the transmitter data to the unspecified large number of receivers, the transmitter data including additional information may be transmitted to the game apparatus 1r acting as a receiver. For example, information representing a title of an image to be transmitted from the game apparatus 1t acting as the transmitter and/or the number of images to be transmitted therefrom may be included in the transmitter data to be transmitted. Thus, the game apparatus 1r acting as the receiver displays not only the user name of the transmitter but also information representing a title of an image and the number of images both of which are included in received transmitter data, so that information for helping a user of the receiver to select a transmitter is increased, and the user of the receiver is allowed to select a transmitter so as to more fully meet the requirements. A user of the game apparatus 1t acting as the transmitter may select, from among predetermined titles, a title of an image to be included in the transmitter data, or the user may freely input a title thereof. Further, a user of the game apparatus 1t acting as the transmitter may input the number of images which the user desires to transmit, as the number of images to be included in the transmitter data, or the number of images to be included in the transmitter data may be the number of photographs stored in the game apparatus 1t.

Further, the screen display as described above is only an example, and it should be understood that another screen display may be used. For example, although in the exemplary screen display shown in FIG. 9 information indicating that image data is being transmitted or received is displayed, the information may not be displayed when a time period in which the image data is transmitted or received is substantially short.

Although in the above description a still image photographed by the game apparatus 1, and the like, are transmitted and received among the game apparatuses 1, a moving image may be transmitted and received. In this case, a moving image to be transmitted may be a moving image photographed by the game apparatus 1 or may be a moving image received from another apparatus or may be a stored moving image other than a photographed moving image.

In the embodiment described above, the process is returned to step 51 when a user selects end of transmission or end of reception by him/herself. Specifically, although an exemplary operation in which the process is returned to a process step for helping a user to determine whether an image is to be transmitted to another game apparatus 1r or an image is to be received from another game apparatus 1t is described, the process may not be returned to the process step. For example, also when a user selects end of transmission or end of reception by him/herself, the process step of step 56 may be performed. That is, the communication with another game apparatus 1 communicating with the own apparatus may be stopped, and a screen indicating that the communication is stopped is displayed (see the left drawing or the right drawing of FIG. 11), and the process of the flow chart may be ended.

Further, in the aforementioned embodiment, as an example of the liquid crystal display section having two screens, described is the lower LCD 12 and the upper LCD 22 which are physically separated from each other and are disposed one on top of the other (when two screens, that is, an upper screen and a lower screen, are used). However, the display screen of the two screens may have another structure. For example, the lower LCD 12 and the upper LCD 22 may be aligned side-by-side on one main surface of the lower housing 11. Further, a vertically long LCD (that is, the LCD is a physically single LCD but has the vertical length of two display screens), which has the same width as the lower LCD 12 and twice the length of the lower LCD 12, may be disposed on one main surface of the lower housing 11 so as to display two images one on top of the other (that is, the two images are displayed, adjacent to each other, one on top of the other with no boundary portion being provided). Moreover, a horizontally long LCD, which has the same length as the lower LCD 12 and twice the width of the lower LCD 12, may be disposed on one main surface of the lower housing 11 so as to display two game images side-by-side (that is, the two game images may be side-by-side displayed adjacent to each other with no boundary portion being provided). That is, a physically single screen may be divided in two so as to display two images, respectively. In any of the aforementioned methods for displaying the images, the touch panel 13 is disposed on the screen for displaying the display image to be displayed on the lower LCD 12, thereby enabling other embodiments to be similarly realized. Furthermore, in a case where the physically single screen is divided into two so as to display the two images, the touch panel 13 may be disposed all over the whole screen so as to cover two screens.

In addition, in the aforementioned embodiment, the touch panel 13 is integrated into the game apparatus 1. Needless to say, however, also when the game apparatus and the touch panel are separately provided, certain example embodiments can be realized. Further, the touch panel 13 may be provided on the upper surface of the upper LCD 22, so as to display, on the upper LCD 22, a display image to be displayed on the lower LCD 12. Furthermore, although in the aforementioned embodiment two display screens (that is, the lower LCD 12 and the upper LCD 22) are provided, the number of display screens provided may be one. That is, in the aforementioned embodiment, it is also possible to provide only the lower LCD 12 as a display screen and the touch panel 13 thereon without the upper LCD 22 being provided. In addition, in the aforementioned embodiment, the lower LCD 12 is not provided, and the touch panel 13 may be provided on the upper surface of the upper LCD 22, so as to display, on the upper LCD 22, a display image to be displayed on the lower LCD 12 described above.

Although in the aforementioned embodiment the touch panel 13 is used as input means for the game apparatus 1 so as to allow a coordinate point input, another pointing device may be used. Here, the pointing device is an input device for designating an input position or a coordinates point on a screen. For example, a mouse, a track pad, a track ball or the like is used as input means, and positional information which is represented by using a screen coordinate system and calculated from an output value obtained from the input means can be used to similarly realize certain example embodiments.

Furthermore, for a stationary game apparatus for allowing a player holding a game controller to enjoy a game, another type of a pointing device may be used. For example, it is possible to use, as the pointing device, a camera securely fixed to a housing of a game controller. In this case, an image taken by the camera varies depending on a position designated by the housing of the game controller. Therefore, by analyzing the taken image, a coordinate point designated on a display screen by the housing can be calculated. It should be understood that certain example embodiments can be realized when the game apparatus 1 does not include a pointing device itself such as the touch panel 13.

Moreover, although in the embodiment described above the hand-held game apparatus 1 or a stationary game apparatus is used, an information processing apparatus such as a typical personal computer may execute the image communication program according to certain example embodiments.

The shape of the game apparatus 1, and the shapes of each button of the operation button 14 and the touch panel 13 in the game apparatus 1, the numbers of the buttons thereof and the touch panels 13 therein, setting positions of each button and the touch panel 13 therein, and the like, which are described above, are only examples. It should be understood that certain example embodiments may use other shapes, numbers, and setting positions than those described above. The order in which the steps are executed in the image communication process, the screen displays used in the image communication process, and the like are only examples. It should be understood that certain example embodiments may include a different order to the execution of the steps described above, and different screen displays than those described above.

According to certain example embodiments, the image communication system, the image communication apparatus, and the storage medium having the image communication program stored therein enable a user to receive an image from a transmission-end apparatus desired by the user when an image is transmitted and received among apparatuses, and are applicable as a system for transmitting and receiving image data such as a photograph among apparatuses, an apparatus included in the system, and the like, and as a program executed by the apparatuses, and the like.

While the embodiments have been described in detail, the foregoing description is in all aspects illustrative and not restrictive. It is understood that numerous other modifications and variations can be devised without departing from the scope of the invention.

The invention claimed is:

1. An image communication system for transmitting images, the system comprising:
   a plurality of image communication apparatuses that includes at least a first communication apparatus and a second communication apparatus, the plurality of image communication apparatuses configured to transmit and receive the images by performing direct wireless communication with each other,
   wherein the first communication apparatus includes:
      an image storage medium configured to store a plurality of images;
      a processing system that includes at least one processor, the processing system configured to:
         transmit identification information of the first communication apparatus to at least one unspecified image communication apparatus that includes the second communication apparatus, the identification information including information indicating that the first communication apparatus is a transmitter;
         receive, from at least the second communication apparatus, identification information that includes destination information of a destination of where an image that is to be transmitted;
         transmit at least one image out of a plurality of the images that are stored in the image storage medium to the destination indicated by the received destination information, a number of the at least one image transmitted being less than a number of the plurality of images and the number of the at least one image being no greater than a limit value;
         receive an image transmission continuation request from the second apparatus after transmission of the at least one image out of a plurality of the images;
         transmit at least one image of a remainder of images of the plurality of images to the second communication apparatus in accordance with the reception of the image transmission continuation request;
   the second communication apparatus including:
      a storage medium that is configured to store an image that is transmitted from the first communication apparatus;
      a processing system that includes at least one processor, the processing system configured to:
         receive identification information of the first communication apparatus, the identification information including information that the first communication apparatus is to act as the transmitter;
         output, to at least one display, information that relates to the received identification information of the first communication apparatus;
         receive, from a user input device operated by a user, a selection as to whether or not an image is to be received from the first communication apparatus based on the displayed information;

transmit destination information to the first communication apparatus that indicates the destination of where the transmitted image is to be sent based on the user selection;

receive the at least one of a plurality of the images that is transmitted from the first apparatus;

store the received at least one of the plurality of the images in the storage medium;

receive user input of an indication of whether or not another image is to be received from the first communication apparatus; and transmit the image transmission continuation request to the first communication apparatus based on the indication.

2. The image communication system according to claim 1, wherein the processing system of the second communication apparatus is further configured to:

receive identification information from each one of a plurality of different communication apparatuses, the plurality including the first communication apparatus;

output, to the at least one display, the received identification information of each one of the plurality of different communication apparatuses; and receive a selection, via the user input device, of one of the plurality of received identification information.

3. The image communication system according to claim 1, wherein the processing system of the first communication apparatus is further configured to output, to the at least one display, an indication of the second communication apparatus in accordance with the received destination information.

4. The image communication system according to claim 1, wherein the received identification information of the first communication apparatus includes transmitter user information which is settable by a user of the first communication apparatus, and wherein the processing system of the second communication apparatus is further configured to output, to the at least one display, the transmitter user information as information indicating the image communication apparatus which transmits the transmitter information.

5. The image communication system according to claim 3, wherein the destination information includes destination user information which is settable by a user of the second communication apparatus, and wherein the processing system of the first communication apparatus is further configured to output, to the at least one display, the destination user information as information indicating the image communication apparatus which requests the image transmission.

6. The image communication system according to claim 1, wherein the processing system of the first communication apparatus is further configured to select, after receiving the destination information, an image to be transmitted to the second communication apparatus, in accordance with an operation performed by a user, and wherein the selected image is transmitted to the second communication apparatus.

7. The image communication system according to claim 6, wherein selection of the image to be transmitted is done through an interface that displays, on the at least one display, the images stored in the image storage medium as possible subjects of images to be transmitted.

8. The image communication system according to claim 6, wherein:

the image storage medium of the first communication apparatus includes:

a storage medium disposed internally to the first communication apparatus; and a detachable storage medium that is configured to detachably mount to the body of the first communication apparatus, wherein the processing system of the first communication apparatus is further configured to select one of the storage medium disposed internally and the detachable storage medium, and the selected image is selected from among images stored in the selected storage medium.

9. The image communication system according to claim 1, wherein the processing system of the first communication apparatus is further configured to:

select an image to be transmitted, in accordance with an operation performed by a user, after receiving the image transmission continuation request, and transmit the selected image, to the second communication apparatus, when the image transmission continuation request is received.

10. The image communication system according to claim 1, wherein the limit value is related to a number of images to be simultaneously transmitted.

11. The image communication system according to claim 1, wherein the processing system of the second communication apparatus is further configured to transmit reception end information to the first communication apparatus when an image is not to be received, and wherein the processing system of the first communication apparatus is further configured to transmit, each time the image transmission continuation request is received, an image to only the second communication apparatus that transmitted the image transmission continuation request, and does not transmit an image to the image communication apparatus transmitting the reception end information.

12. The image communication system according to claim 11, wherein the processing system of the second communication apparatus is further configured to monitor storage capacity of the storage medium of the second communication apparatus, and the reception end information is transmitted to the first communication apparatus, when a remaining storage capacity is smaller than or equal to a capacity.

13. The image communication system according to claim 1, wherein:

the image storage medium of the second communication apparatus includes:

a storage medium disposed internally to the second communication apparatus; and a detachable storage medium that is configured to detachably mount to the body of the second communication apparatus, wherein the processing system of the second communication apparatus is further configured to predetermine a selection of the storage medium disposed internally and the detachable storage medium such that the received image is stored on the selection.

14. The image communication system according to claim 1, wherein each of the plurality of image communication apparatuses further includes an imager that is configured to take an image, and wherein the image taken by the imager is stored in a memory medium in accordance with an operation performed by a user, and wherein the image taken is the at least one of a plurality of the images.

15. An image communication apparatus for receiving an image from another image communication apparatus by performing wireless communications directly with each other, the image communication apparatus comprising:

a storage medium that is configured to store an image that is transmitted from the another image communication apparatus;

a processing system that includes at least one processor, the processing system configured to:

receive, from the another image communication apparatus, identification information of the another image communication apparatus, the identification information including information that the another image communication apparatus is to act as an image transmitter;

output to at least one display information relating to the received identification information of the another image communication apparatus;

receive from a user input device operated by a user a selection as to whether or not an image is to be received from the another image communication apparatus based on the displayed information;

transmit own identification information, as destination information indicating a destination, to the another image communication apparatus based on the user selection;

receive at least one image that is transmitted by the another image communication apparatus to which the destination information is set to be transmitted, a number of the at least one image being less than a number of images stored on the another image communication apparatus and the number of the at least one image being no greater than a limit value;

receive user input of an indication of whether or not another image is to be received from the another image communication apparatus;

transmit an image transmission continuation request to the another image communication apparatus based on the indication; and receive another image from the images stored on the another image communication apparatus in accordance with the image transmission continuation request.

16. An image communication apparatus for transmitting an image to another image communication apparatus by performing wireless communications directly with each other, the image communication apparatus comprising:

an image storage medium configured to store a plurality of images;

a processing system that includes at least one processor, the processing system configured to:

transmit identification information of the image communication apparatus, the transmitter information including information indicating that image communication apparatus is a transmitter, the transmission set transmit to at least one unspecified image communication apparatus that includes the another image communication apparatus;

receive, from at least the another image communication apparatus, identification information of the another image communication apparatus including destination information that indicates a destination;

transmit at least one image out of the plurality of images stored in the image storage medium to the destination indicated by the destination information, a number of the at least one image being less than a number of the plurality of images and the number of the at least one image being no greater than a limit value;

receive an image transmission continuation request from the another image communication apparatus; and transmit at least one image of a remainder of images of the plurality of images to the another image communication apparatus in accordance with the reception of the image transmission continuation request.

17. An image communication apparatus for receiving an image from another image communication apparatus or transmitting an image to another image communication apparatus by performing direct wireless communication with the another image communication apparatus, the image communication apparatus comprising:

image storage medium for storing an image; and transmission/reception determination processing circuitry for determining whether an image is to be received from another image communication apparatus or an image is to be transmitted to another image communication apparatus;

wherein when the transmission/reception determination processing circuitry determines that an image is to be received from another image communication apparatus, the image communication apparatus further comprises:

transmitter information reception processing circuitry for receiving, from the another image communication apparatus, identification information of the another image communication apparatus, as transmitter information indicating a transmitter;

selection processing circuitry for performing display so as to indicate the transmitter on display processing circuitry in accordance with the transmitter information having been received, and allowing a user to select whether or not an image is to be received from the another image communication apparatus having transmitted the transmitter information;

destination information transmission control processing circuitry for transmitting its own identification information, as destination information indicating a destination, to the another image communication apparatus which is selected by the selection processing circuitry as the transmitter from which an image is to be received;

image reception processing circuitry for receiving an image transmitted from the another image communication apparatus to which the destination information is transmitted;

image storage control processing circuitry for storing, in the image storage medium, the image received by the image reception processing circuitry;

determination processing circuitry for receiving, after the image reception processing circuitry receives an images transmitted from the another image communication apparatus, an input from the user while displaying the image, and determining based on the input whether or not an image is to be further received from the another image communication apparatus; and a transmitter that is configured to transmit, when the determination processing circuitry determines that an image is to be further received, an image transmission continuation request to the another image communication apparatus, and wherein when the transmission/reception determination processing circuitry determines that an image is to be transmitted to another image communication apparatus, the image communication apparatus further comprises:

transmitter information transmission control processing circuitry for transmitting, to another unspecified image communication apparatus, its own identification information as transmitter information indicating a transmitter;

destination information reception control processing circuitry for receiving, from the another image communication apparatus, identification information of the another image communication apparatus, as the destination information indicating the destination;

limitation processing circuitry that is structured to limit a number of images to be transmitted; and image transmission processing circuitry for: 1) transmitting, to the destination indicated by the received destination information, at least one of a plurality of the images stored in the image storage medium, a number of the at least one image being less than a number of the plurality of images and the number of the at least one image being no greater than the limit number of images to be transmitted; and; 2) transmitting, upon reception of the image transmission continuation request, at least one image of a remainder of images of the plurality of images to the another image communication apparatus.

18. A non-transitory computer-readable storage medium having stored therein computer readable instructions for use by a first computing apparatus that is configured to receive an image from a second computing apparatus that is separate from the first computing apparatus via direct wireless communications, the first computing apparatus including a user input device, a processing system that includes at least one processor, a storage medium, and at least one display, the stored instructions comprising instructions that are configured to:

receive transmitter information from the second computing apparatus, the transmitter information including identification information of the second computing apparatus;

output to a display on the first computing apparatus information relating to received transmitter information;

receive a selection via the user input device operated by a user as to whether or not an image is to be received from the second computing device;

transmit receiver information that includes identification information of the first computing apparatus as a destination for at least one image to be transmitted to the second computing apparatus;

receive at least one transmitted image that is from the second computing apparatus which is set to receive the identification information of the first computing apparatus, a number of the at least one transmitted image being less than a number of images stored on the second computing apparatus and the number of the at least one image being equal to a limit value;

store the transmitted image in the storage medium;

receive user input of an indication of whether or not another image is to be received from the second computing apparatus;

transmit an image transmission continuation request to the second computing apparatus based on the indication; and receive another image from the images stored on the another image communication apparatus in accordance with the image transmission continuation request.

19. A non-transitory computer-readable storage medium storing computer readable instructions for use by a computing apparatus that operates in a first mode or a second mode, the first mode for receiving an image from an image communication apparatus other than the computing apparatus, the second mode for transmitting an image to an image communication apparatus other than the computing apparatus, communications between the computing apparatus and the image communication apparatus other than the computing apparatus occurring over a direct wireless connection, the stored instructions comprising instructions configured to:

store at least one image in a storage device of the apparatus;

determine whether to activate the first mode or the second mode;

in the first mode:

receive transmitter information indicating a transmitter from another communication apparatus;

display, to a user, information that indicates the another communication apparatus is to transmit in accordance with the received transmitter information;

accept user input of whether or not an image is to be received from the another communication apparatus having transmitted the transmitter information;

transmit identification information of the computing apparatus that includes a destination to the another communication apparatus;

receive an image transmitted from the another communication apparatus to which the identification information of the computing apparatus was transmitted;

store, in the storage device, the received image;

receive user input of an indication of whether or not another image is to be received from the another communication apparatus; and transmit an image transmission continuation request to the another communication apparatus based on the indication, in the second mode:

transmit, to an unspecified image communication apparatus other than the computing apparatus, identification information of the computing apparatus that includes transmitter information indicating the transmitter is the computing apparatus;

receive, from the another communication apparatus, identification information of the another communication apparatus, as the destination information indicating the destination;

impose a limit on a number of images to be transmitted in a transmission;

in a first transmission, transmit at least one of a plurality of the images stored in the storage device to the destination indicated by the destination information, a number of the at least one image to be transmitted being less than a number of the plurality of images and the number of the at least one image being no greater than a limit value; and in a second transmission, transmit, in response to receiving an image transmission continuation request from the another communication apparatus, at least one further image of the plurality of images to the another communication apparatus.

20. The image communication system of claim 1, wherein the processing system of the first communication apparatus is further configured to receive, prior to transmission of the transmitted at least one image and the at least one image of the remainder of images, a selection from a user that includes the transmitted at least one image and the at least one image of the remainder of images.

21. The image communication apparatus of claim 15, wherein the at least one image that is transmitted by the another image communication apparatus and the another image are both selected before reception of the at least one image that is transmitted by the another image communication apparatus.

22. The image communication apparatus of claim 16, wherein the processing system is further configure to receive a user input selection that specifies a group of images that includes the transmitted at least one image of the plurality of images and the at least one image of the remainder of images prior to transmission of the at least one image and the at least one image of the remainder of images.

23. The image communication apparatus of claim 17, wherein at least one of a plurality of the images and the at least one image of a remainder of images of the plurality of images are selected before the image transmission processing circuitry transmits the at least one of a plurality of the images.

24. The medium of claim 18, wherein the at least one transmitted image and the received at least another image are selected by a user of the another image communication apparatus before the at least one transmitted image is received.

25. The medium of claim 19, wherein the instructions are further configured to, in the second mode, receive, before the first transmission group is transmitted, a user selection of multiple images that includes the transmitted at least one of the plurality of images and the at least one further image of the plurality of images.

26. The image communication system of claim 1, wherein the processing system of the first communication apparatus is further configured to receive, after transmission of the at least one image of the plurality of images, a user selection that indicates the at least one image of the remainder of images.

* * * * *